United States Patent [19]

Actor et al.

[11] 4,153,945
[45] May 8, 1979

[54] MULTIPLEXED CONTROL SUBSYSTEM FOR SENSOR BASED SYSTEMS

[75] Inventors: Elliot J. Actor, Lighthouse Point; Robert F. Kantner, Boca Raton, both of Fla.

[73] Assignee: International Business Machines Corporation, Armonk, N.Y.

[21] Appl. No.: 807,841

[22] Filed: Jun. 20, 1977

[51] Int. Cl.² .................... G06F 3/00; G06F 11/00
[52] U.S. Cl. ................................................ 364/900
[58] Field of Search ........ 364/518, 551, 200 MS File, 364/900 MS File

[56] References Cited

U.S. PATENT DOCUMENTS

| | | | |
|---|---|---|---|
| 3,535,683 | 10/1970 | Woods et al. | 364/900 |
| 3,668,653 | 6/1972 | Fair et al. | 364/200 |
| 3,806,885 | 4/1974 | Moore | 364/200 |
| 3,825,696 | 7/1974 | Long | 179/15 A |
| 3,827,029 | 7/1974 | Schlotterer et al. | 364/200 |
| 3,879,710 | 4/1975 | Maxemchuk et al. | 364/200 |
| 3,925,762 | 12/1975 | Heitlinger et al. | 340/150 |
| 3,930,145 | 12/1975 | Fort et al. | 235/151.3 |

OTHER PUBLICATIONS

Hayes et al., "Multiplexed Control Sub-System", SBIS Newsletter, vol. 2, No. 3, (Sep. 1976), IBM Co.
Kantner, R. F., "Controller for an Automated Building Management Subsystem", IBM Technical Disclosure, vol. 20, No. 8, (Jan. 1978).

*Primary Examiner*—Gareth D. Shaw
*Assistant Examiner*—Michael C. Sachs
*Attorney, Agent, or Firm*—D. Kendall Cooper

[57] ABSTRACT

A sensor based system, such as a building management system, includes a central processor and an associated subsystem comprising at least a central panel interconnected with a plurality of remote panels, each of the remote panels being capable of further interconnection with a variety of devices for monitoring and control purposes. The subsystem is essentially a digital input/-digital output (DI/DO) multiplexer comprising a central panel and from one to fifty remote panels, as an example. A simplified interconnection technique is provided in the subsystem for achieving efficient addressing of the remote panels and their associated sensor devices together with transmission of control and monitoring information. Control signals and status or other indications are handled by manual or computer intervention. Input/Output (I/O) cards are included that provide for all functions required for interfacing the multiplexer subsystem to the individual sensor devices.

9 Claims, 39 Drawing Figures

DIGITAL OUTPUT (DO)
WORD FORMAT

DIGITAL INPUT (DI)
FORMAT

DI/DO COMMAND
TIMING

DI BURST MODE
READ TIMING

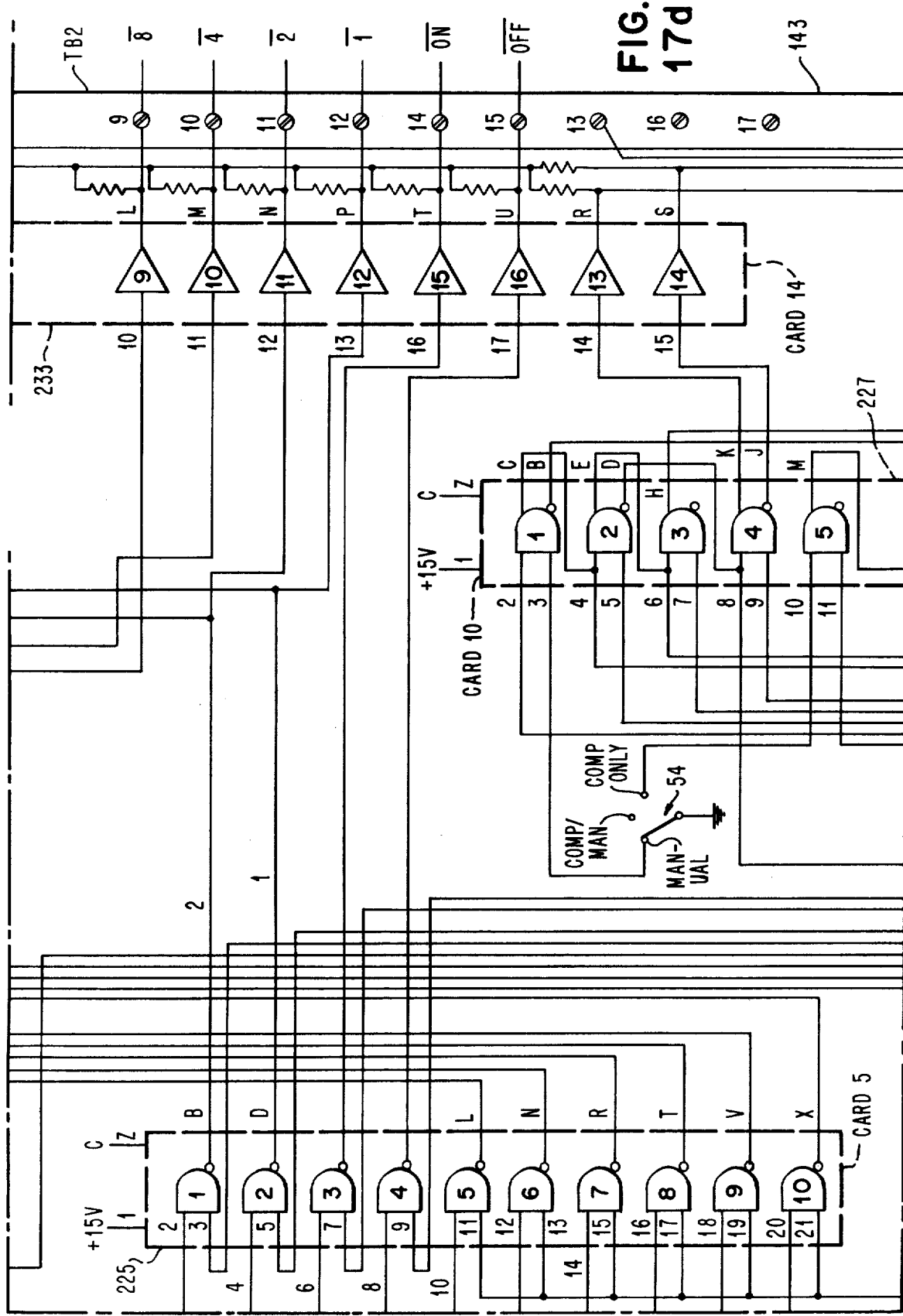

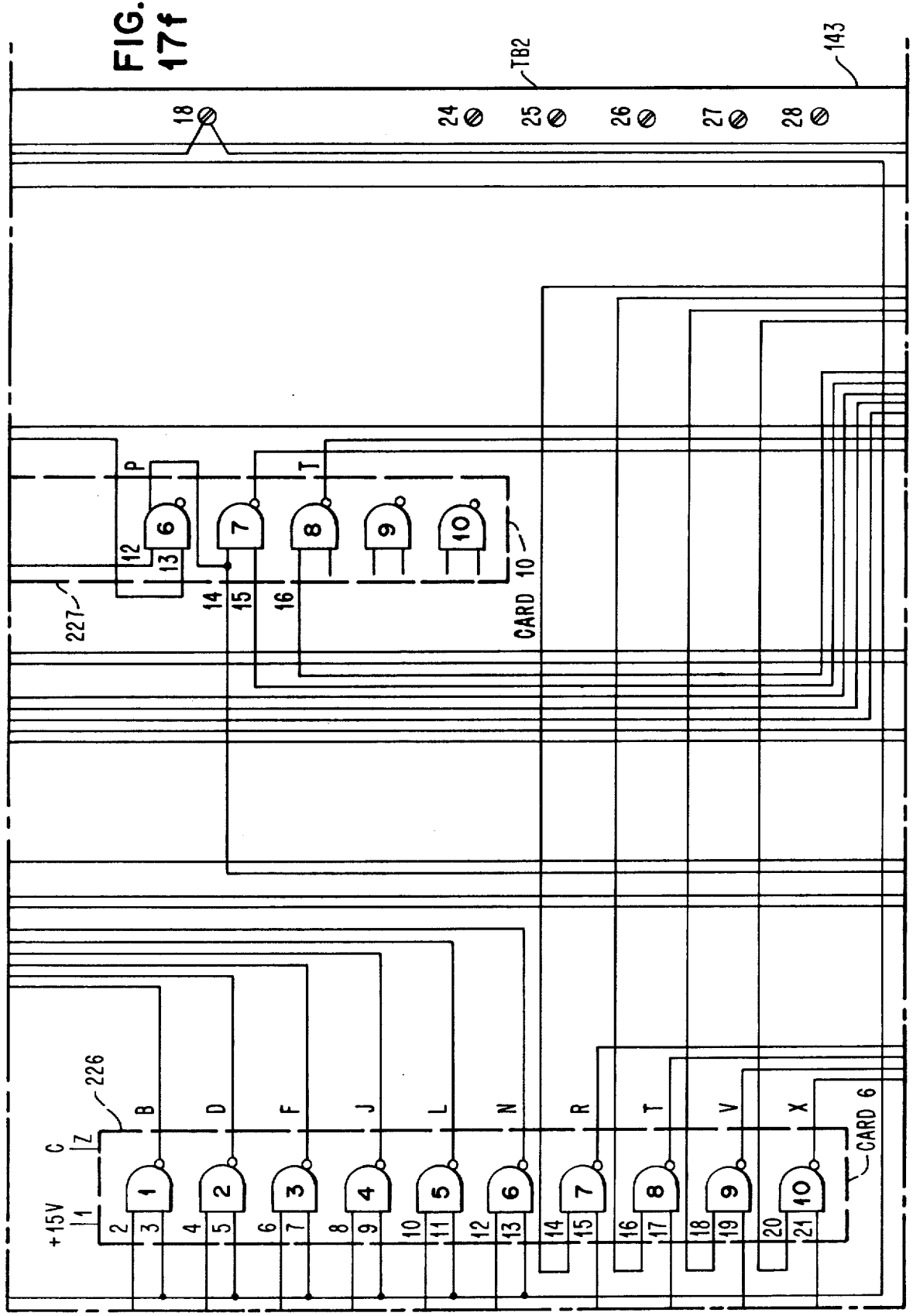

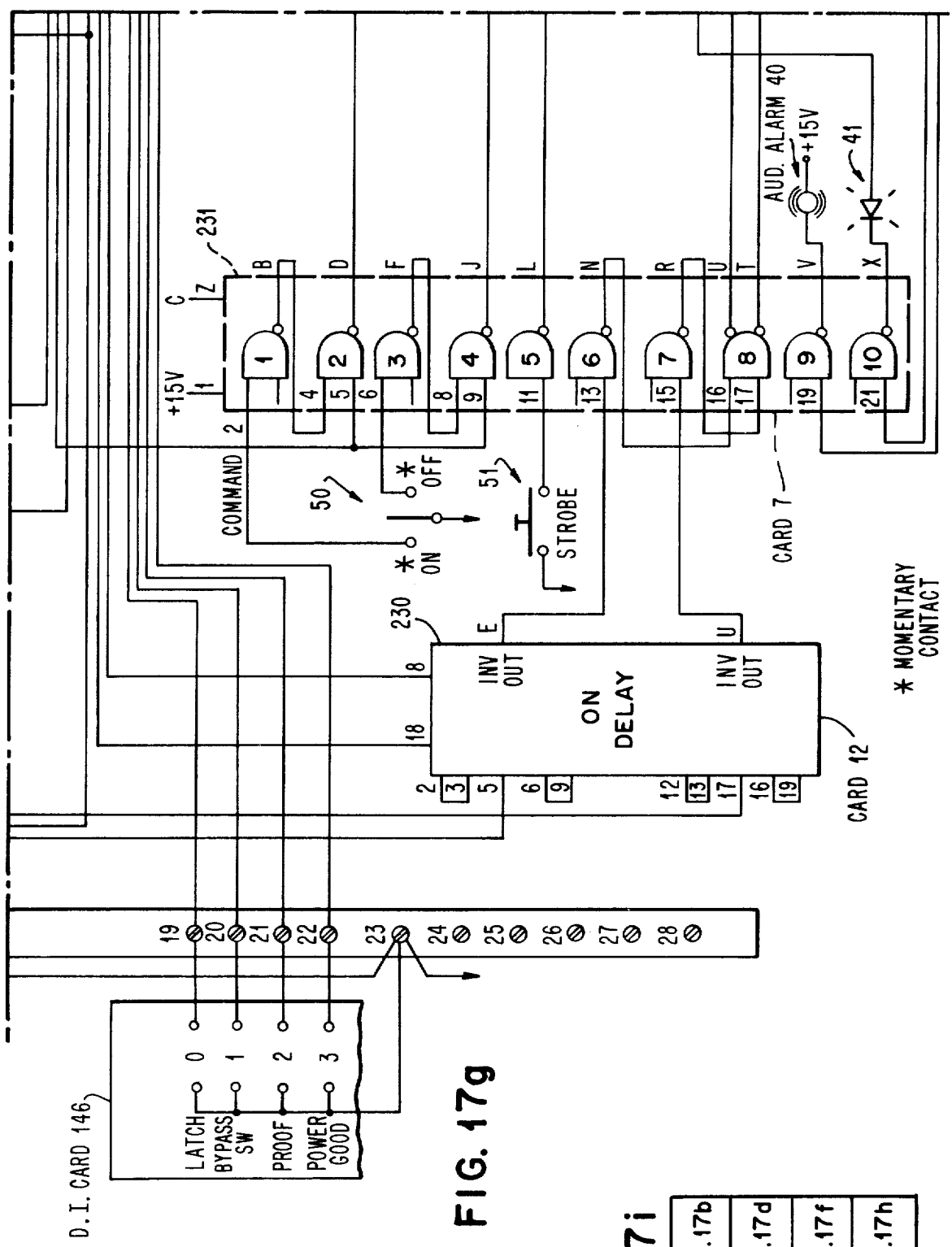

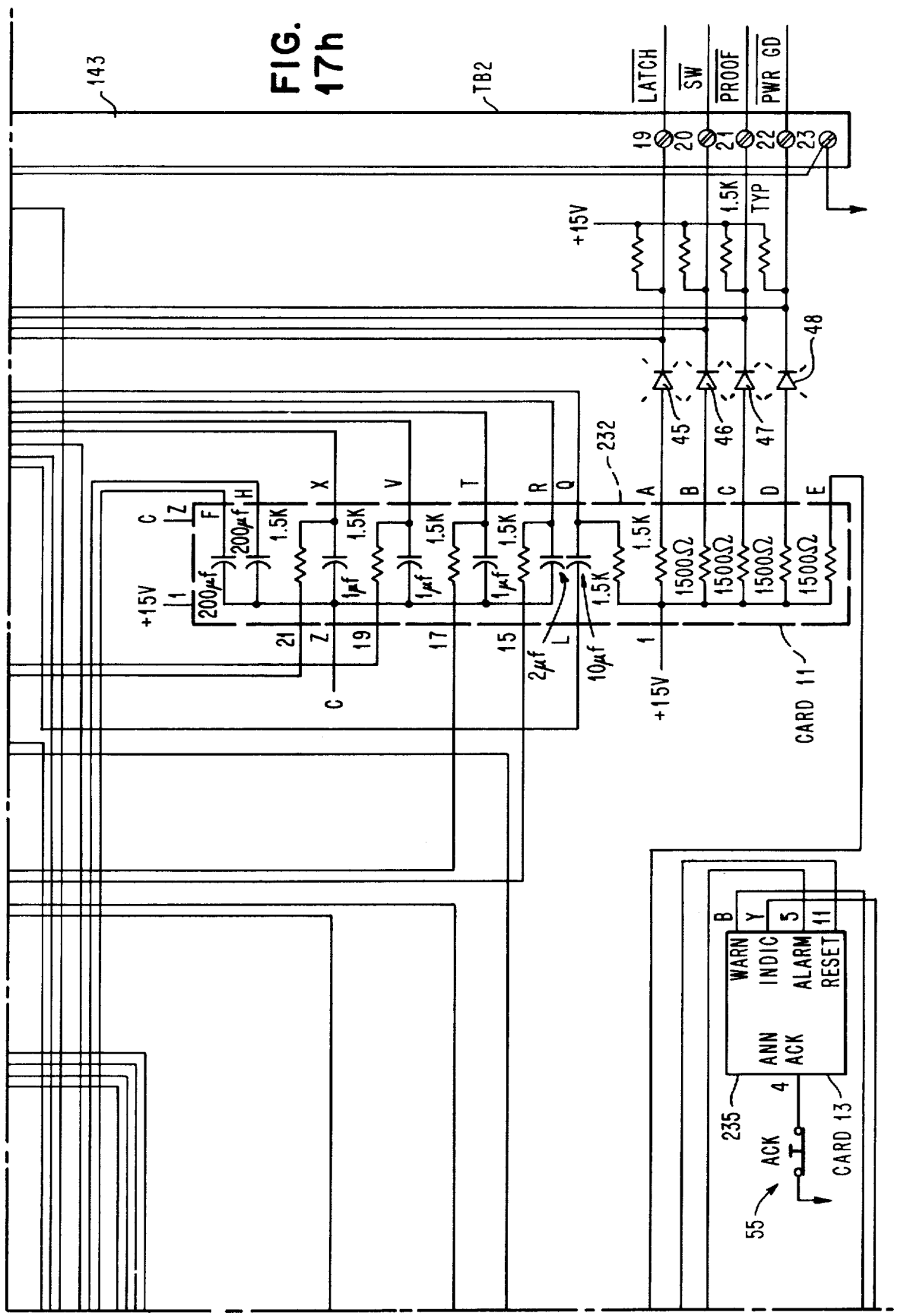

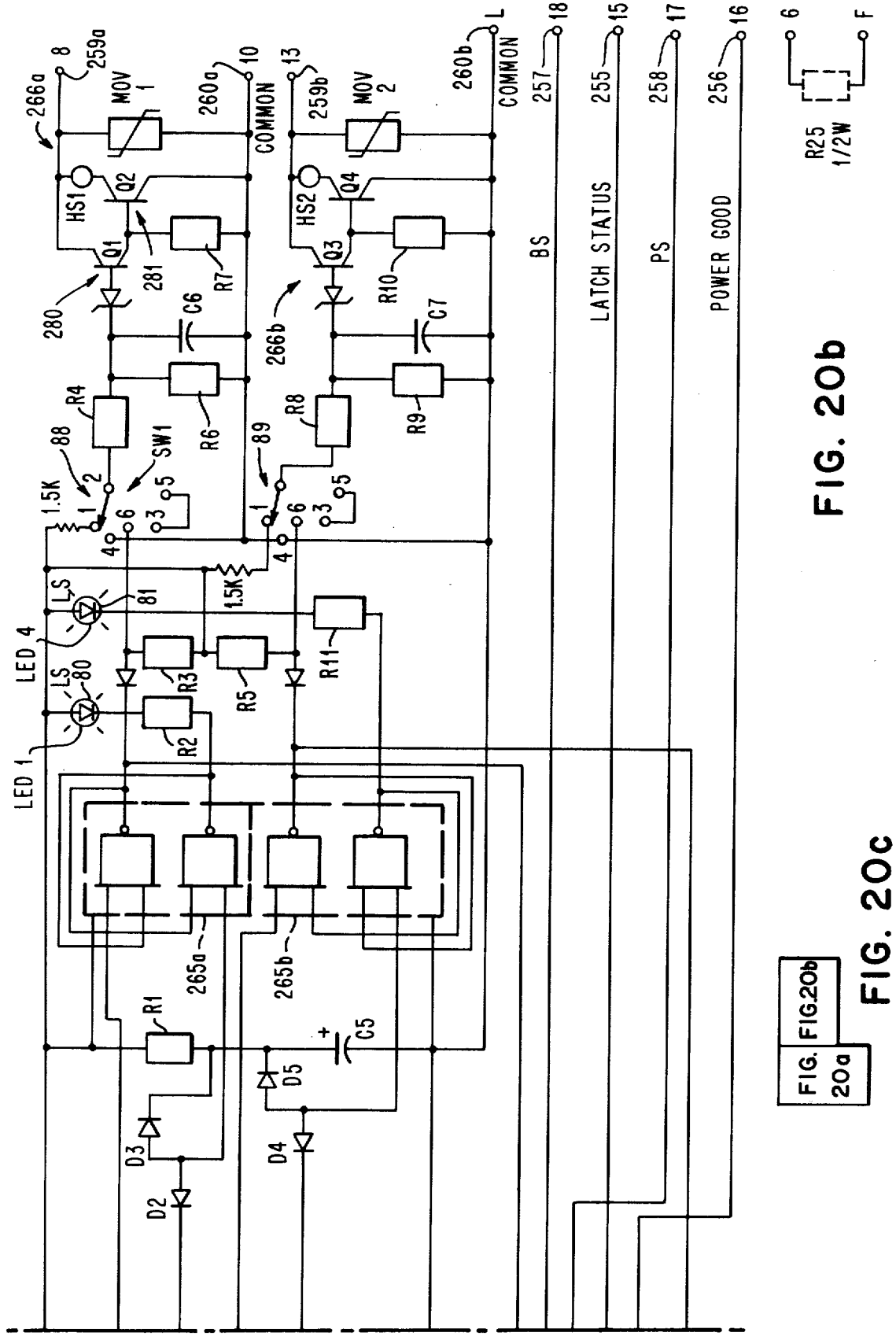

MULTIPLEXED CONTROL SUBSYSTEM FOR SENSOR BASED SYSTEMS

BACKGROUND OF INVENTION AND PRIOR ART

In typical prior building management systems the transmission of control and sensor information has been handled in several ways. As an example, one system is provided with an unduly large number of transmission wires interconnecting the major components in the subsystem with inefficient addressing, relatively slow relay operation, the greater numbers of wires normally tending to make the system more expensive than other systems. In order to avoid the multiplicity of wires situation, other systems have incorporated as few as a pair of wires for handling all information but this requires a serial transmission of control and sensor information with longer time required for such transmission. Encoding and decoding circuits for a system of this nature are more complicated. Thus, inefficiencies are encountered in systems of this nature, as well.

Of further interest, prior systems have provided automated operation but not necessarily a desirable level of manual intervention in the system.

Considering the Input/Output aspects of prior subsystems, ordinarily various significant components have been incorporated in the cabinets in such a manner that they are separately mounted, requiring additional cabling for proper interconnection. In many cases, less flexibility in functions and limited maintenance are encountered.

SUMMARY OF THE INVENTION

In accordance with the present invention, a sensor based system is described that incorporates a central processing unit with associated peripheral devices and interconnected with a multiplexed control subsystem for controlling and monitoring a plurality of remotely located sensor devices. The central processing unit serves as a host processor and provides data and instructions to the subsystem and receives data from the subsystem in return. The system architecture described provides an automated building management capability with basic functions required for energy management, safety, and general building management.

The subsystem is basically a DI/DO multiplexer comprised of a Central Panel (CP) and from one to 50 Remote Panels (RP).

The Central Panel is typically a desk top console which provides a central manual monitoring and control capability.

All devices controlled by the subsystem can be turned on or off manually from this panel and all digital inputs can be monitored. Key switch selected operating modes are:

(a) Manual Only - No computer monitoring or control;
(b) Computer/Manual - Computer has priority;
(c) Computer Only - Manual monitoring, but no control.

The Remote Panels are multidropped from a single 21 conductor cable from the Central Panel, each Remote Panel providing up to 20 control outputs (24V DC to drive control relays at the controlled device) and up to 40 contact sense inputs for directly inputting proof, alarm, and other switches. The subsystem is particularly attractive for applications where controlled devices are clustered and proof or other types of contact sense digital input are required. Full manual control (HOA) and monitoring are provided at each Remote Panel for all connected control and monitoring points extending full Manual Control Panel functions to each Remote Panel.

A subsystem is configured by defining convenient groupings of the control and monitor points and locating one or more Remote Panels in a location which will allow convenient wiring to the controlled and/or monitored devices. A shielded 25 conductor cable is used to connect the Central Panel to all Remote Panels, the Remote Panels being multidropped off the cable.

Each Remote Panel is assigned a three digit address which is set with switches on a pluggable card. Twenty consecutively numbered address channels, starting with the Remote Panel address, are available at the Remote Panel output. Each address channel consists of one latched digital output and two contact sense digital inputs. Two additional digital inputs at each address are dedicated to functions on the output card. One signals the Central Panel (and associated computer) of digital output latch status (set/reset) and the other performs a line supervision function.

The subsystem features a dual Input/Output card providing two independent channels, each having one control point and four status points.

Further, the system provides for both computer and manual intervention according to a prioritized scheme, the computer playing a dominant role, but subject to manual overriding.

OBJECTS

A primary object of the present invention is to provide a system of this nature with efficient transfer of control and data signals. An additional object of the present invention is to provide a system of this nature with efficient utilization of Input/Output connections to the computer.

Still another object of the present invention is to provide a system of this nature with full manual control at both Central and Remote Panels.

A still further object of the present invention is to provide a system of this nature with a requisite level of maintenance and check-out capabilities.

Also, an object of the present invention is to provide a system of this nature which is adaptable to a wide variety of sensor based applications.

The foregoing and other objects, features, and advantages of the invention will be apparent from the following more particular description of the various embodiments of the invention as illustrated in the accompanying drawings.

DRAWINGS

In the drawings:

FIG. 3 illustrates a Remote Panel that may be incorporated in the system of FIG. 1, while

FIG. 10a is a block diagram of the Central Panel in FIG. 1 while FIGS. 10a and 10b should be arranged for connection as shown in FIG. 10c.

Figure 1:
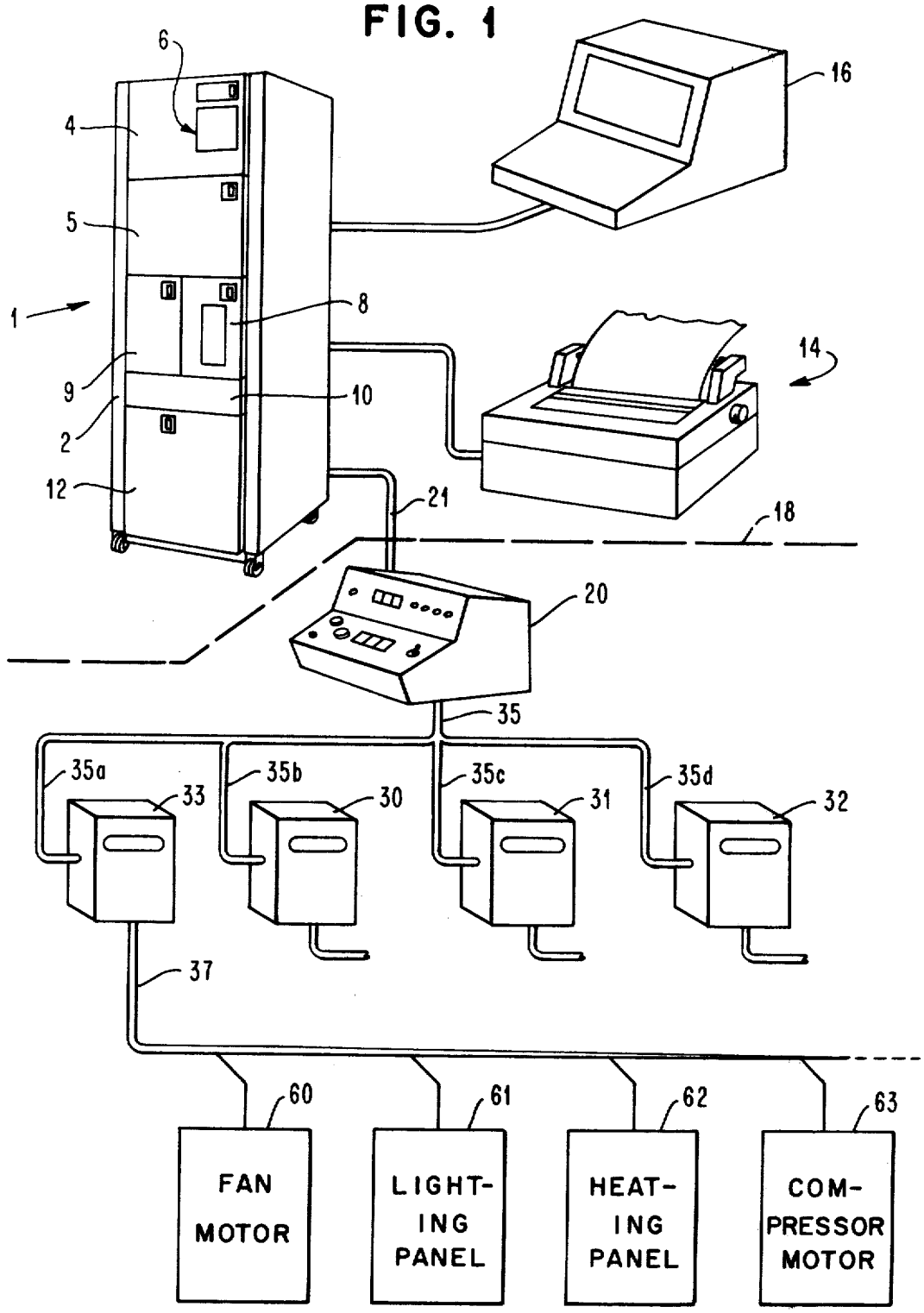
FIG. 1 is a block diagram of a representative sensor based system incorporating a central processing unit interconnected with a Central Panel, a plurality of Remote Panels, and illustrating typical sensor devices that can be controlled and monitored by the computer.

FIGS. 17a-17h comprise a wiring diagram of the Central Panel including in the system of FIG. 1. These figures should be arranged as shown in FIG. 17i.

FIGS. 18a-18d comprise a wiring diagram of an individual Remote Panel illustrated in FIG. 1. These figures should be arranged as shown in FIG. 18e.

Figure 5A:
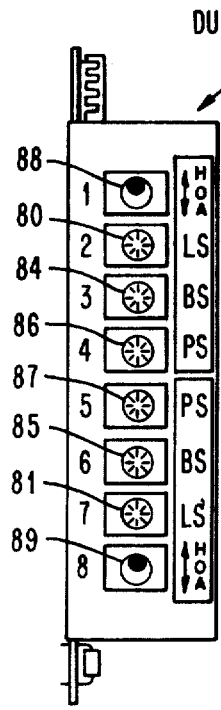
FIG. 5a illustrates an Input/Output card that is provided in the Remote Panel of FIGS. 3 and 4.
Figure 19:
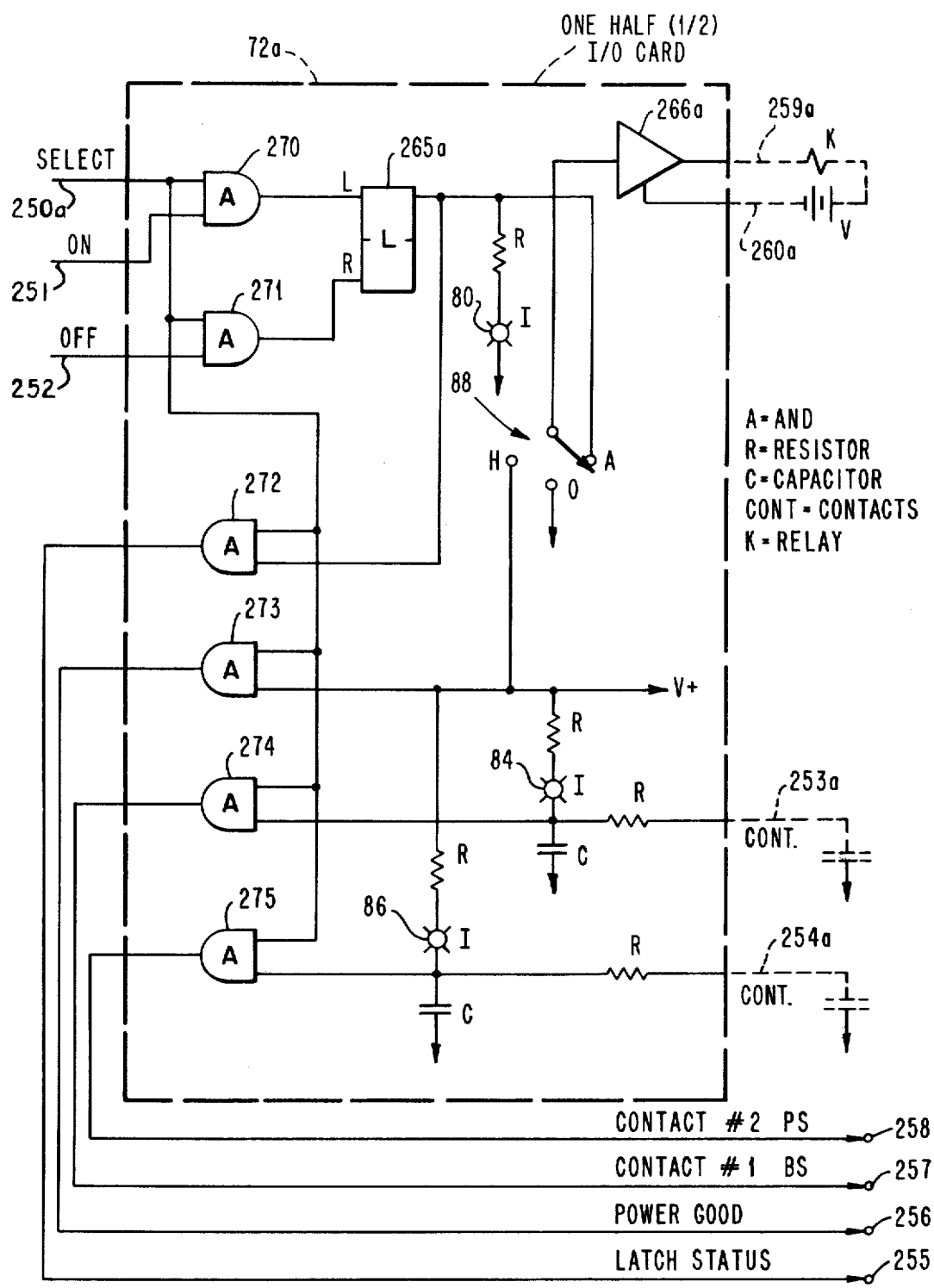
Figure 20A:
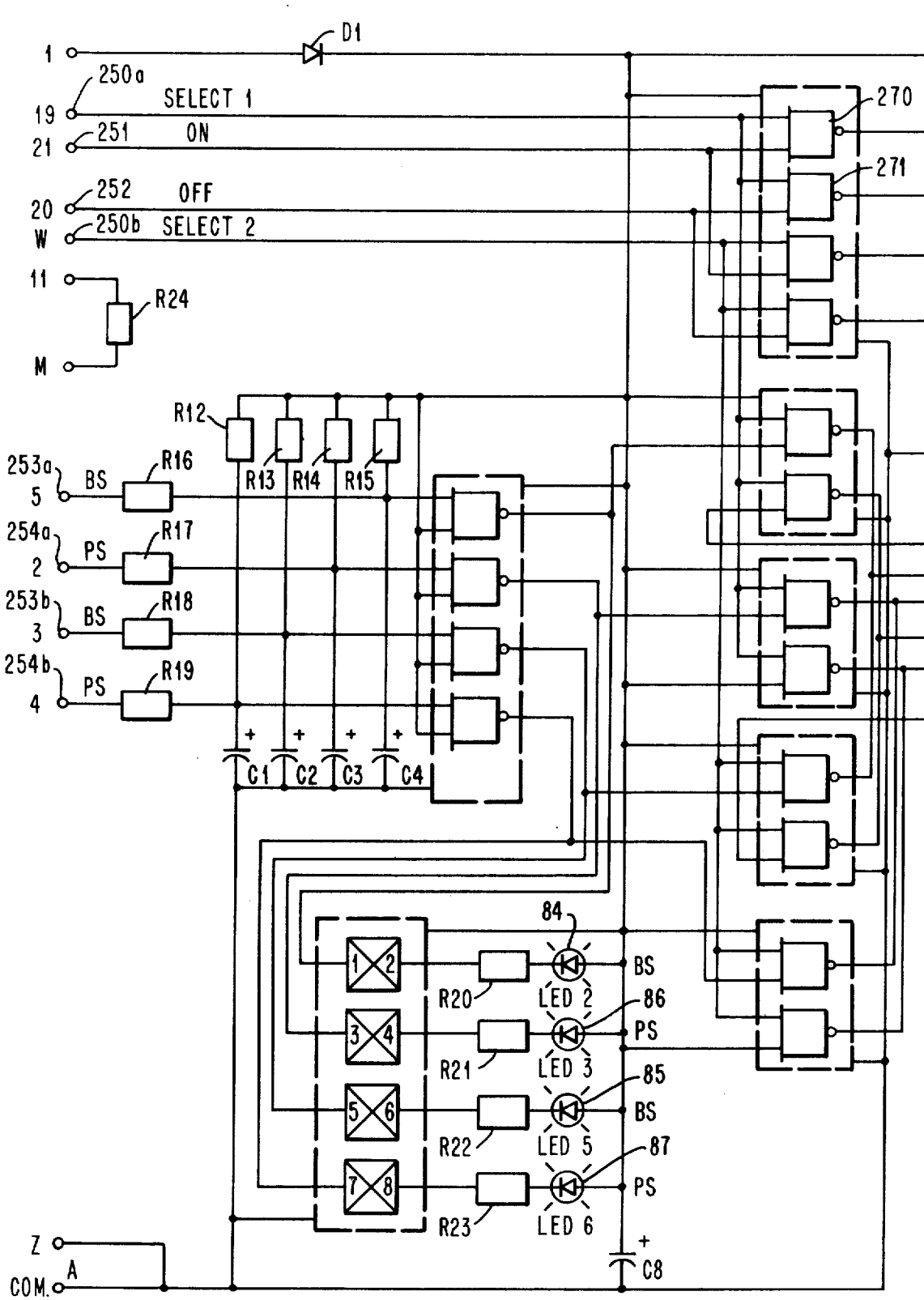

FIG. 19 is a functional diagram of a half portion of an individual Input/Output card such as that shown in FIGS. 5a and 19 while FIGS. 20a and 20b, when arranged as shown in FIG. 20c, form a detailed circuit diagram of a complete dual Input/Output card.

General Description of the System

FIG. 1 illustrates a representative system comprising a central processing unit, associated peripheral devices, a central panel, a number of remote panels, and interconnected sensor devices. For convenience, the Central Processing Unit 1 is illustrated as the IBM Series/1 having a cabinet 2 for mounting various modules involved in operation of the system. Modules 4 and 5 comprise the central processing unit logic with Module 4 including a Programmer Console 6. Module 8 is a diskette unit including a removable two-sided flexible diskette that can be used to transfer data or to load programs into the system. Module 9, a sensor Input/Output unit, consists of a power supply, terminator card, and slots for eight sensor I/O feature cards, as an example. Ordinarily, any of the following cards can be used: Digital Input/Process Interrupt, nonisolated (16 points per card); Digital Input/Process Interrupt, isolated (16 points per card); Digital Output, nonisolated (16 points per card); Analog Input Control (with analog-to-digital converter).

Item 10 is simply a filler panel. Item 12 is a disk storage module having a non-removable disk with, as an example, a capacity of 9.3 megabytes.

The IBM Series/1 System is described in a variety of publications available to the general public as well as patent applications pending in the U.S. Patent Office. The Central Processing Unit, together with associated input and output devices, is generally characterized as a minicomputer. The IBM 4953 Processors, Models A, B, C or D or the IBM 4955 Processors, Models A, B, C or D can serve the functions of Central Processing Unit 1 with their associated channels. Printer 14 is the IBM 4974 Printer. As a matter of additional information, a minicomputer Central Processing Unit like the IBM Series/1 Processors and Central Processing Unit 1 is described in the U.S. Pat. Application, Ser. No. 682,002 concerning a subroutine linkage operation, filed Apr. 30, 1976, having Michael I. Davis et al as inventors now issued as U.S. Pat. No. 4,041,462. The system may include input and output devices such as described in the aforesaid Davis et al patent application as well as the IBM 4979 Display Station 16 available with the Series/1 System.

Multiplexed Control Subsystem

The Multiplexed Control Subsystem comprises the components below the line 18 in FIG. 1, less items 60–63. The Multiplexed Control Subsystem is a sensor I/O multiplexer comprised of a central panel 20 and from one to 50 remote panels, such as remote panels 30–33.

The subsystem:
Controls up to 1,000 discrete devices.
Monitors up to 2,000 independent contact sense inputs.
Utilizes line supervision and status checking.
Requires minimum computer I/O (16 DO, 4DI).
Full manual backup (both local and remote).
Contains display for manual use as well as for checkout.
Is easily personalized, customized and expanded.
Can be maintained by building electricians with off the shelf hardware.
Has wiring costs minimized through distributed panels.

Typically, the multiplexed control subsystem is offered in two models:
Model 1
—One central panel
—One to 50 remote panels
Model 2
—One to 50 remote panels
The model configurations will be discussed below.

Central Panel

Figure 2:
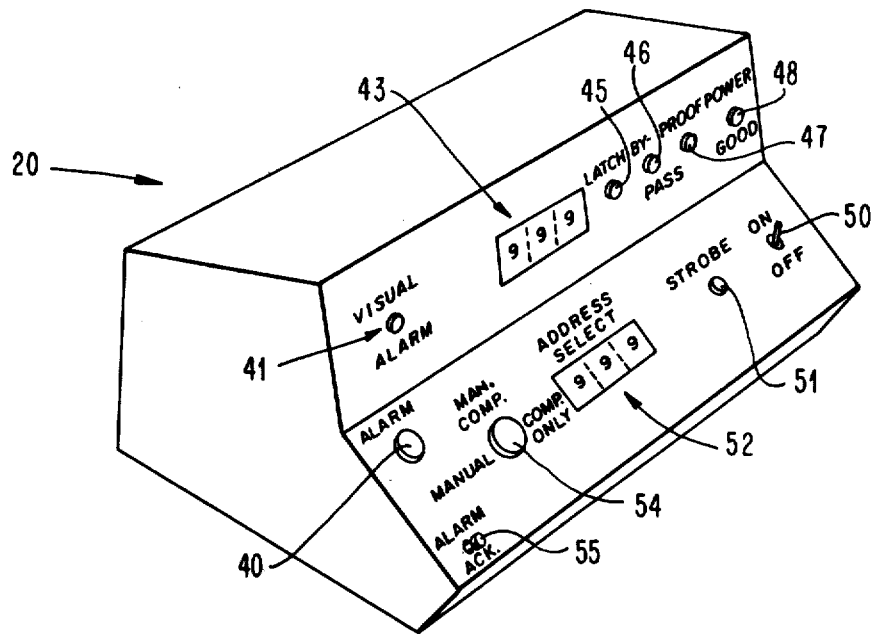
FIG. 2 illustrates a Central Panel that is useful in the system shown in FIG. 1.

The central panel console 20, FIGS. 1 and 2, is a desk top console that provides manual control and monitoring. All devices controlled by the subsystem can be turned on or off manually, and all digital inputs can be monitored from the console. Console 20 is interconnected to CPU 1 by bus 21 through the Sensor I/O Module 9, FIG. 1.

The central panel console 20 has:
Visual and audible alarms
Display
Status indicators
Command switch
Strobe switch Address select
Mode switch
Alarm acknowledge The audible alarm 40 and the visual alarm indicator 41 are activated whenever the processor stops sending the operations monitor signal to the central panel indicating an error determined by the processor.

The display 43 is a three digit Light Emitting Diode (LED) display showing the address that is active.

There are four status indicators 45–48 that indicate the status of the digital input point being monitored (address shown in the display). From left to right the status indicators are:

Latch status 45
Bypass status 46
Proof status 47
Power good

These are examples and may vary depending on the system.

The command switch 50 is for manually turning devices controlled by the subsystem either on or off.

The strobe switch 51 enables the command set by the command switch to be activated at the address shown in the display.

The address select switch 52 allows manual selection of a remote point for control and monitoring.

The mode switch 54 is a key switch with three positions for selecting command control of the subsystem.
1. Manual only—No processor monitoring or control.
2. Processor/Manual—Processor or manual can control the subsystem. When the processor does not request control, the subsystem defaults to manual.
3. Processor only—Processor commands only, default to manual address. (For monitoring only.)

The alarm acknowledge 55 turns off the audible alarm. The visual alarm remains on until reset by the processor.

Remote Panels

Remote panels 30–33 are multidropped from a single cable 35 having 25 conductors with branch cables 35a–35d. As an example, remote panel 33 is tied to the system through the branch cable 35a and in turn is interconnected by cable 37 to a number of sensor devices that are being monitored and controlled. In the particular system illustrated in FIG. 1, these are shown as sensor devices that are ordinarily encountered in a building management system, as an example. These devices include fan motor 60, lighting panel 61, heating panel 62, and compressor motor 63. Each remote panel, such as remote panel 33, provides up to 20 control outputs and up to 40 contact sense inputs are provided for directly inputting proof, alarm, and other switches by way of cable 37. Full manual control command commonly referred to as Hand Off Auto (HAO) and monitoring are provided at each remote panel for all connected control and monitoring points.

Figure 3:
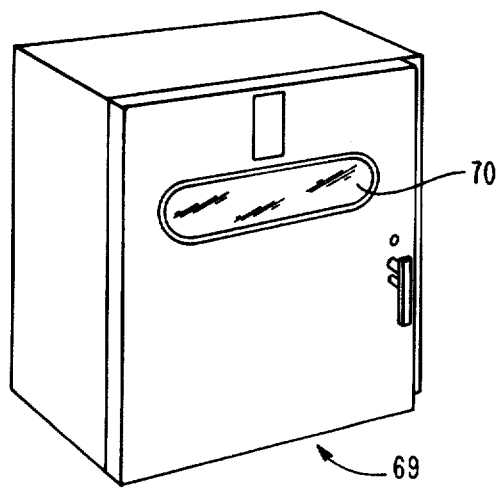
Figure 4:
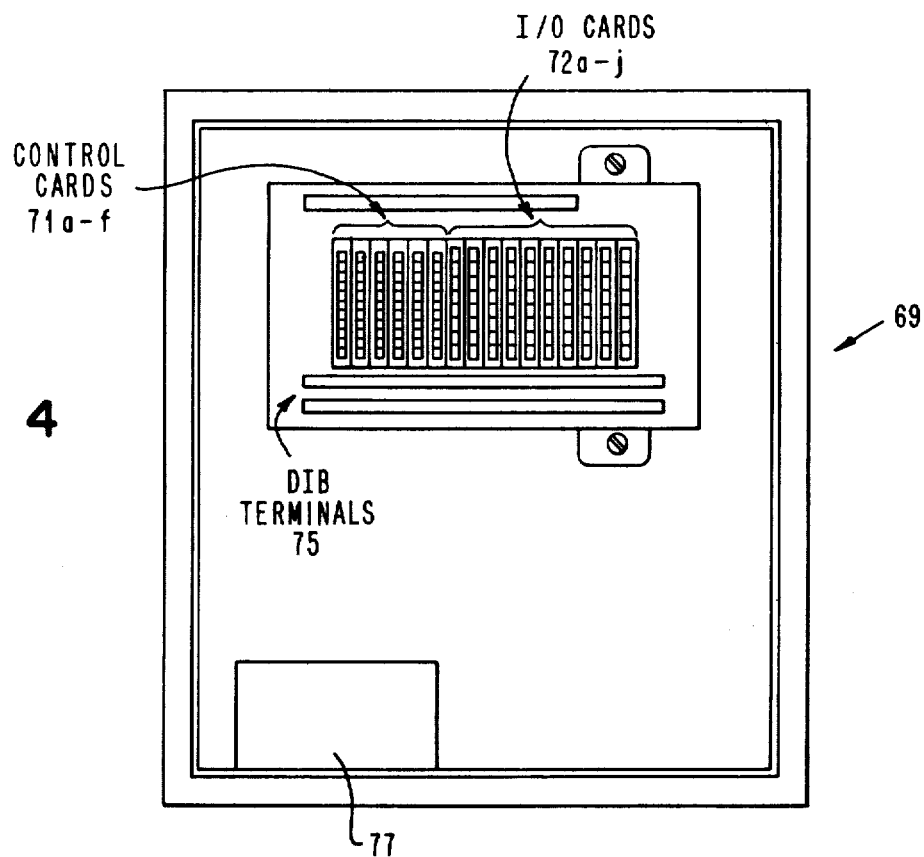
FIG. 4 illustrates the interior of the Remote Panel of FIG. 3.

More detailed representations of the remote panel, such as remote panel 33, are shown in FIGS. 3 and 4, FIG. 3 comprising an external view and FIG. 4 comprising an internal view of the panel.

The components of the remote panel are:
Window 70
Control cards 71a–f
I/O cards 72a–j
Device Interface Box (DIB) terminals 75
Power supply 77

The window 70 is located in the door 69 of the remote panel and allows visual inspection of HOA and LED settings on the I/O cards without opening the door. Six control cards 71a–f are standard with each remote panel. Cards 71a and 71c are involved in addressing, card 71c containing the address switches. Twenty consecutively numbered address channels, starting with the remote panel address, are available. Ten positions are available for I/O cards 72a–j. Each remote panel will have from one to ten I/O cards depending on the number of points to be monitored and/or controlled. DIB terminals on strip 75 are used for connecting the controlled remote panel and/or monitored devices to the Device Interface Boxes (DIB) at the sensor devices 60–63. A 15V dc power supply 77 is used for powering the control cards.

The remote panels 30–33 can also be used to monitor or control the devices attached, by using the switches and status indicators on the dual I/O cards. FIG. 5a shows the switches and status indicators on the dual I/O card.

Remote panel status can be monitored continuously using the status indicators on the dual I/O cards. These indicators are Latch Status (LS) 80 and 81, Bypass Status (BP) 84 and 85, and Proof Status (PS) 86 and 87. It is noted that the Power Good Indicator 48 on Central Panel 20, FIG. 2, is not repeated at the Remote Dual I/O cards. The status of the latch (control output set from the central panel) and the two external contact sense inputs Proof and Bypass are continuously displayed.

Control at the remote panel can be set using the Hand Off Auto (HOA) toggle switches 88 and 89 on the dual I/O cards. The following table shows the switch setting and the control operation.

| Switch Setting | Operation |
| --- | --- |
| H-Hand | I/O card control output is turned on. |
| O-Off | I/O card control output is turned off. |
| A-Auto | I/O card control output is controlled by the latch output set at the central panel. |

Figure 5B:
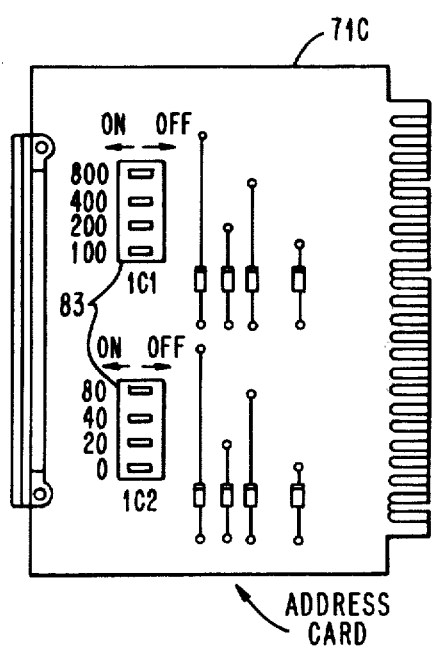
FIG. 5b is a side elevation of a Remote Panel Address Card.

The individual remote panels 30–33 are addressed with a starting address, each remote panel having its own address. In order to set up the address of a particular remote panel, the address card shown in FIG. 5b is removed and various switches set in the desired configuration. Address card 71c includes two sets of switches 83, comprising four rocker switches in each set. The switches are set to appropriate on and off positions in order to establish the address required for this particular remote panel. Thereafter, the card is reinstalled in the remote panel.

Signal Cable Routing

Figure 6:
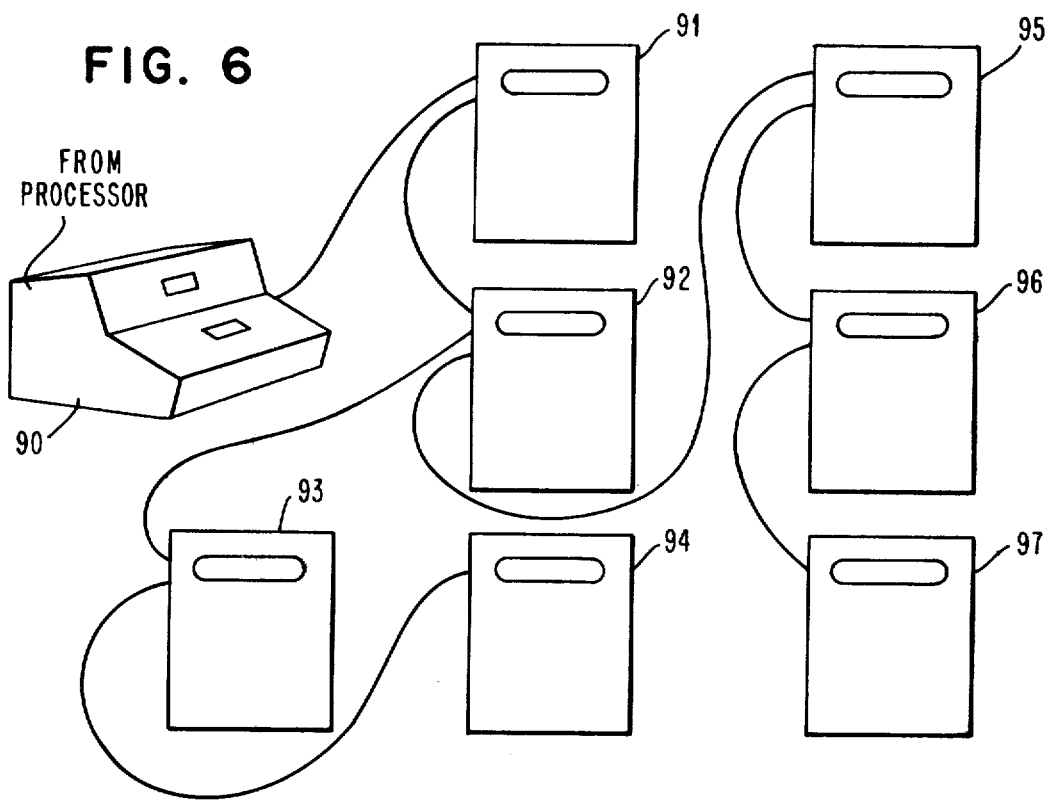
FIG. 6 illustrates a subsystem incorporating a Central Panel interconnected with a number of Remote Panels in a seriesparallel configuration.
Figure 7:
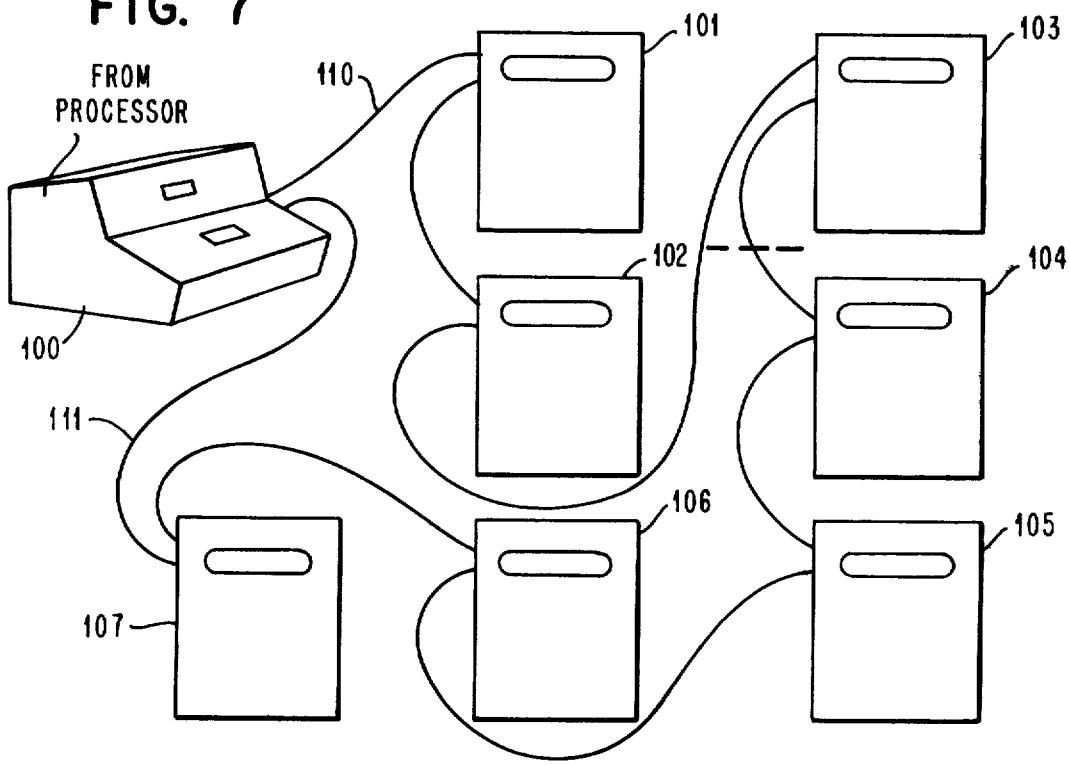
FIG. 7 illustrates a Central Panel interconnected with a number of Remote Panels in a loop configuration.

FIGS. 6 and 7 illustrate typical signal cable routing with FIG. 6 representing a series-parallel routing plan and FIG. 7 illustrating a closed loop routing plan. In FIG. 6, Central Panel 90 is interconnected in series with Remote Panels 91 and 92. Additional panels 93 and 94 are connected in a first parallel path while additional panels 95, 96, and 97 are connected in a second parallel path from Remote Panel 92. In FIG. 7, Central Panel 100 is connected in a closed loop configuration with Remote Panels 101–107. This configuration has the advantage that the signal cable can be broken at one point while still maintaining full operation of all remote panels in the system. That is, if a break in the interconnecting cable between Remote Panels 103 and 104 should occur, communication can still be maintained from Central Panel 100 with all of the remote panels. Thus, Remote Panels 101, 102, and 103 can be accessed by way of the cable 110 while Remote Panels 104, 105, 106, and 107 can be accessed by way of cable 111.

System Operation

The subsystem is a bus control system utilizing a 12 line address bus, a two line command bus, and a four line data bus for communicating commands and data between the central panel and remote panels. The central panel accepts/provides manual inputs/outputs as well as computer inputs/outputs depending on the operating mode selected by the mode switch.

Figure 8A:
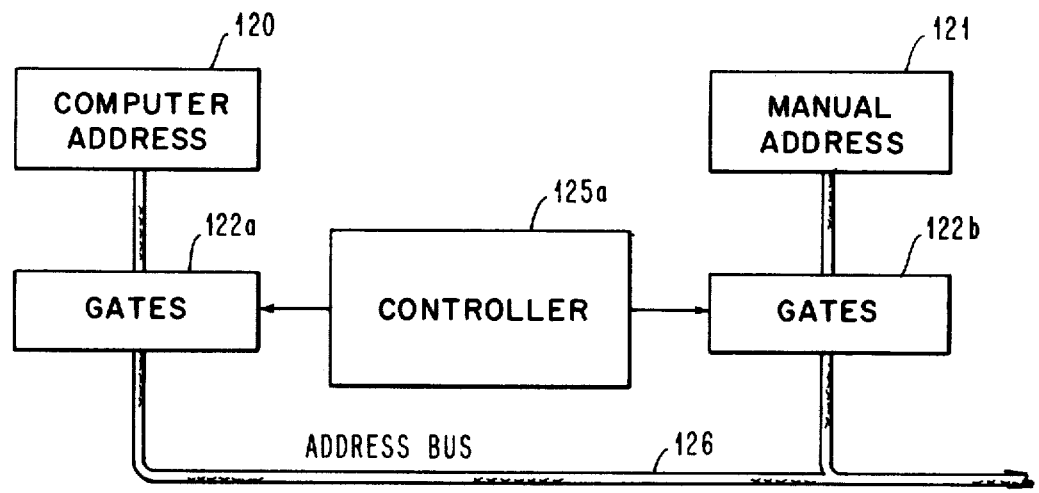
FIGS. 8a and 8b are block diagrams of computer and manual addressing and command connections to the address and command busses in the subsystem.
Figure 8B:
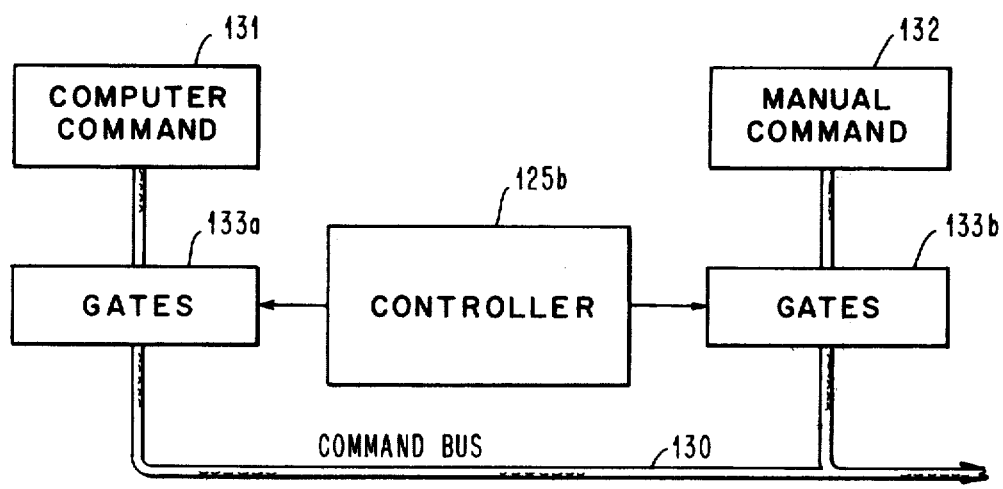

FIGS. 8a and 8b show the address and command inputs to the respective busses and the gating inputs (strobes) required from a controller to control inputs to the address and command busses. FIG. 8a includes a Computer Address Block 120, a Manual Address Block 121, the respective address blocks having associated gating circuits 122 and 123, each of which in turn is connected to controller circuits 125. Address indications are selectively gated from Address Blocks 120 and 121 to Address Bus 126. FIG. 8b is comparable to FIG. 8a except that, in this case, the Command Bus 130 derives command indications from the Computer Command Block 131 or Manual Commands Block 132 through respectively associated Gating Circuits 133 and 134 with selection of the Gating Circuits 133 and 134 controlled by Controller Block 125b.

Signal Cable Connections

Figure 9:
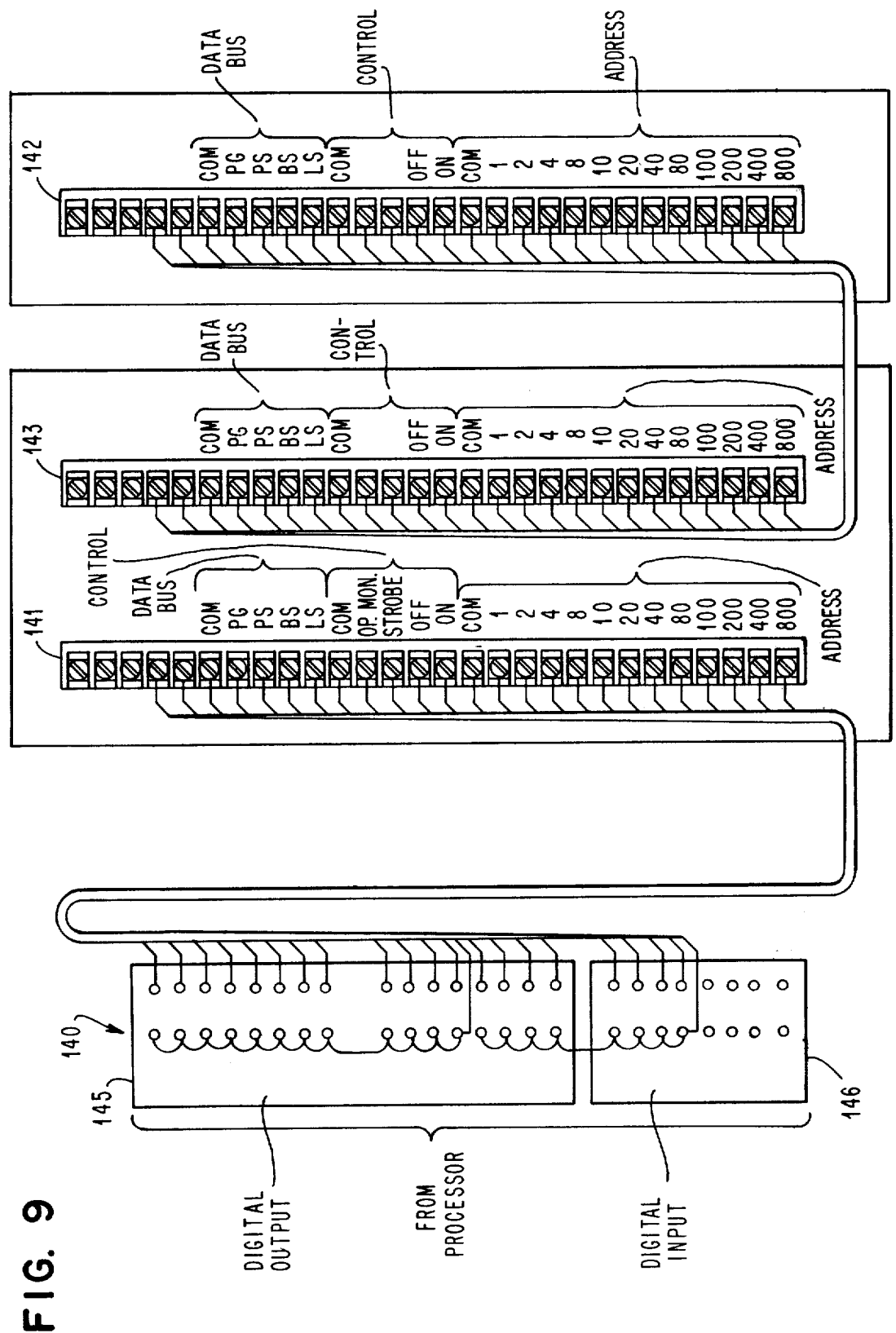
FIG. 9 illustrates typical cable and terminal connections for the system of FIG. 1.

FIG. 9 illustrates the signal cable connections of a typical system including processor connections 140, central panel connections 141, and connections 142 for a single remote panel. The processor connections 140 are incorporated on a digital output card 145 and a digital input card 146. Referring to connecting terminals 41, most of the designations are self-explanatory or have been explained already but "COM" refers to a Common termination. "OP. MON." designates an Operations Monitor termination. The numerical representations 1, 2, 4, et cetera through 800 are binary representations used in the addressing in the subsystem.

Subsystem Block Diagram

Figure 10A:
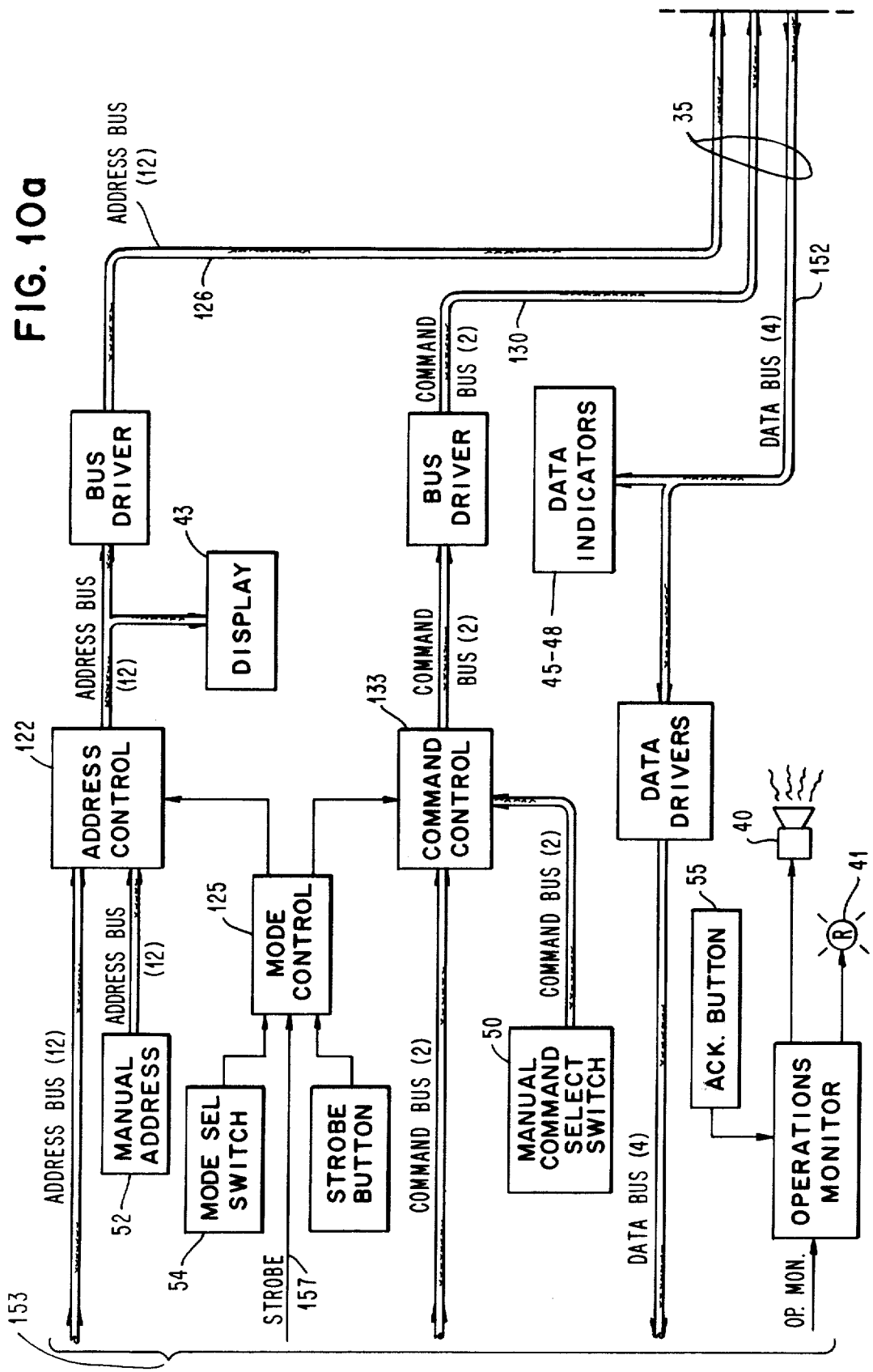
Figures 10B, 10C:
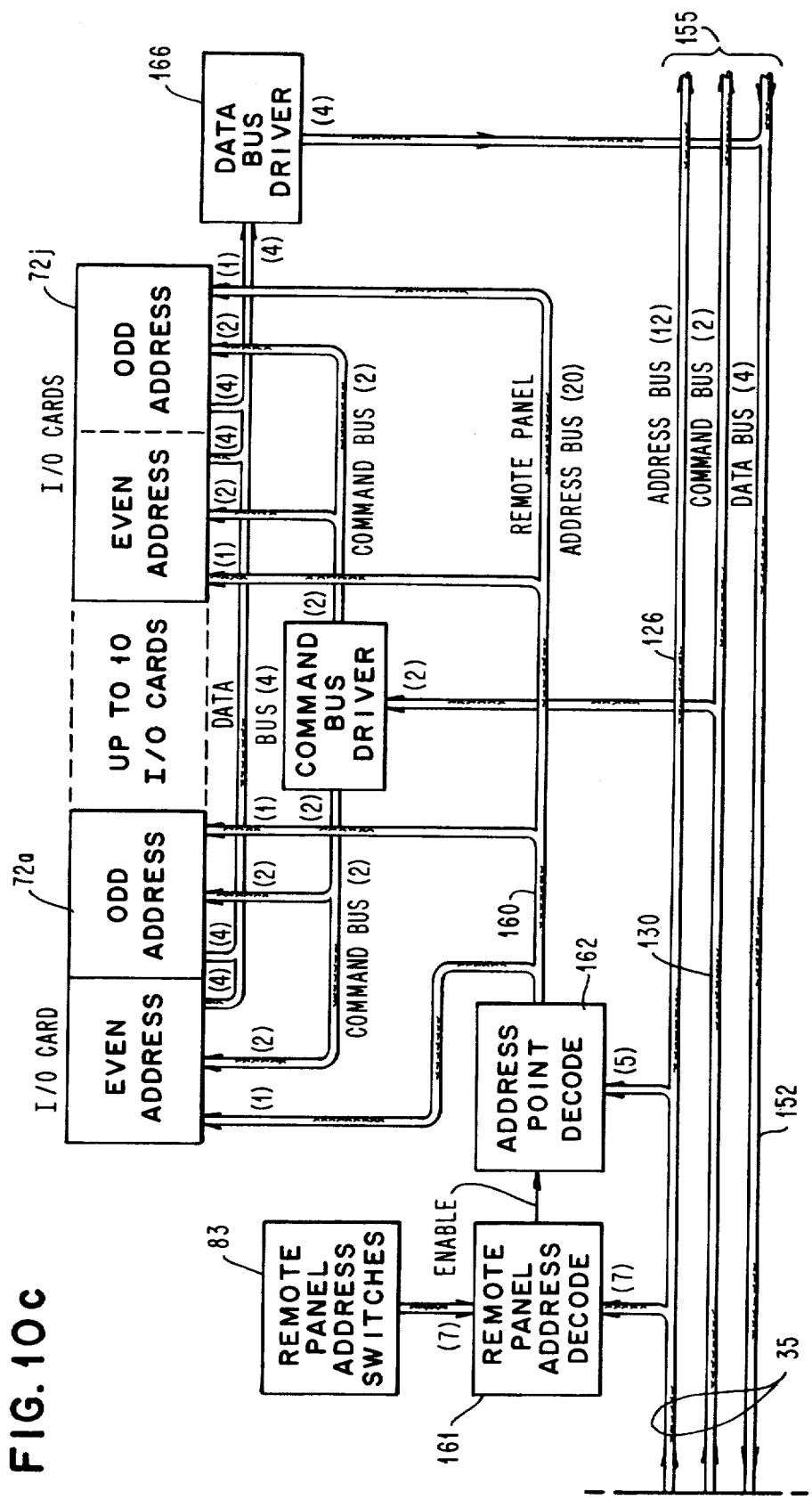
FIG. 10b is a block diagram of an individual Remote Panel in the system of FIG. 1.

FIGS. 10a and 10b, when arranged as shown in FIG. 10c, represent a subsystem block diagram. In particular, FIG. 10a illustrates various functional blocks provided in Central Panel 20, FIG. 1, the various blocks being interconnected by Address Bus 126, Command bus 130, and Data Bus 152 that are incorporated in Bus 35, FIG. 1, with the functional blocks of an individual remote panel in FIG. 10b. The central panel is interconnected with the computer by various lines and busses indicated by bracket 153, FIG. 102. Continuation of the cable 35 to other remote panels is indicated by bracket 155, FIG. 10b.

The central panel design provides the required address and command controls for the unique set of operating modes established by the subsystem mode switch.

Key-operated mode switch 54 selects one of the three system operating modes by way of mode control block 125.

1. Manual only—addresses and commands may be entered only via manual address switched 52 and command switch 50.

2. Computer only—commands may be entered only via the computer interface, bracket 153. When the computer is entering commands, it supplies a computer strobe signal on line 157 to the system. The address is also supplied via the computer interface. When the computer is not active supplying a strobe, the address is supplied via the manual address switches. This allows manual monitoring of the data bus 152 which is controlled by the address bus but does not allow manual commands to be initiated.

3. Computer/Manual—this allows both computer and manual commands to be entered with the computer having priority. The computer can gain control of the system at any time by providing a computer strobe, line 157. Any time the computer interface is not active (strobe not present) manual addresses and commands may be entered into the system.

Commands are not allowed on the command bus 130 unless a well established address is present on the address bus 126. Changing addresses with a command active on the command bus is likely to be spuriously decoded sending the command to an incorrect address.

Manual commands are strobed using a single shot included in command control block 133 on the command bus. This prevents holding the manual strobe switch and manually scanning addresses.

Initiating a computer command when operating in Computer/Manual mode requires an orderly transfer of both command and address bus control to prevent spuriously generated commands. When the computer strobe is initiated, the following sequence is required:
 Clear the command bus by inhibiting the manual command strobe.
 Transfer address bus control to the computer.
 Allow computer access to the control bus.

When terminating a computer command a similar sequence is required.
 Clear the command bus by dropping the computer command strobe.
 Transfer address bus control to the manual input.

Removing the computer strobe removes the inhibit of the manual command strobe which allows manual commands to be strobed to the command bus after a suitable time delay to assure address control has been properly transferred.

The remote panel design provides the required address decode and command driver for the operating modes required by the subsystem. FIG. 10b is a block diagram of the remote panel which contains the dual I/O cards. Depending on the number of devices being monitored from one to ten cards 72a–72j are used.

An individual function group on an I/O card is enabled by providing an address "select" input by cable 160 to select a desired group. Each group of functions is comprised of (1) a latched driver which can be turned "on" or "off" using command inputs from the subsystem; and (2) four digital outputs to the subsystem providing status information of the specific function group. The select line is provided from an address decoder where each function group is given a specific address. Only one group of functions is selected at a given time. The commands ("on", "off") are provided by a two line command bus and the status lines are connected to a four line data bus.

Three indicators and one manual switch are provided for each group of functions. This allows local manual control of the control driver and local display of function status.

The status displayed by the indicators is the status of the latched circuit and two contact sense inputs. Typically the control driver would be used to control (on-/off) a device such as an air handler, etc., and the contacts sensed would be "proof," "alarm" or other status switches associated with the controlled device. The fourth digital input to the subsystem is a "power good" signal from the card. In the subsystem this provides a "line supervision" function for checking for valid addresses.

All switches and indicators are included in the assembly of the logic card so that they are physically available to an operator when the card is plugged into a card receptacle.

In FIG. 10b, switches 83 establish the remote panel address, as previously discussed.

A binary coded decimal address (12 bits) is transmitted from the central panel to all connected remote panels. The address is either manually set from the central panel or by the computer via the computer interface depending on the selected operating mode of the central panel. Each I/O card, such as card 72a, has two independent addressable function groups. These are designated odd and even for convenience and are correspondingly addressed by odd and even addresses. The first I/O card is addressed by the first two addresses in the remote panel address sequence beginning with the remote panel address established by the address switches 83. The second I/O card, not shown, has the next two addresses in the sequence. This sequence continues on through the I/O card which contains the 19th and 20th addresses in the sequence.

The address is decoded in the remote panels and the addressed device selected by blocks 161 and 162. The digital input (4 bits) from the addressed device is then transmitted on the data bus to the central panel where indicators are provided for manually observing status and status signals are available on the computer interface. Data bus driver 166 provides additional bus driving power.

After addressing the device, on/off commands can be sent to the device either manually or via the computer depending on the central panel operating mode.

Each connected device can be removed from central panel control at the remote panels and manually controlled from that location for maintenance purposes. Hand/off/auto toggle switches are provided as well as indicators for observing device status for each controlled device.

Typical Sensor Devices

Figure 11:
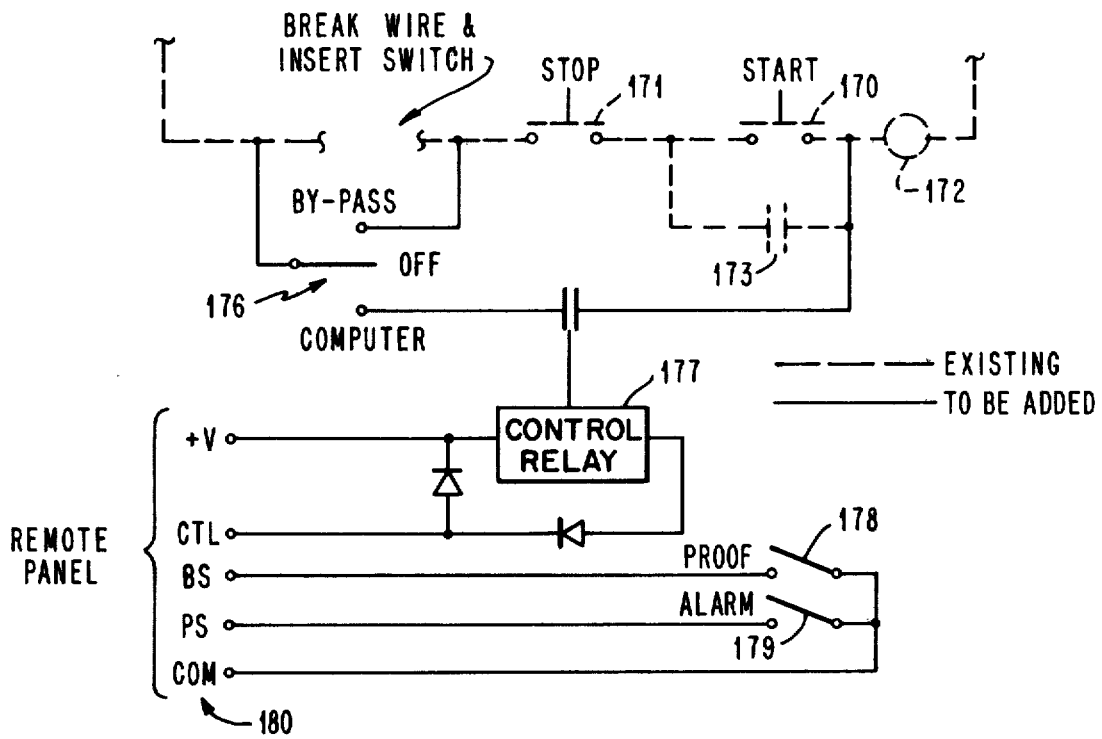
FIG. 11 is a wiring diagram illustrating connection of a push button start stop controlled device to a Remote Panel.
Figure 12:
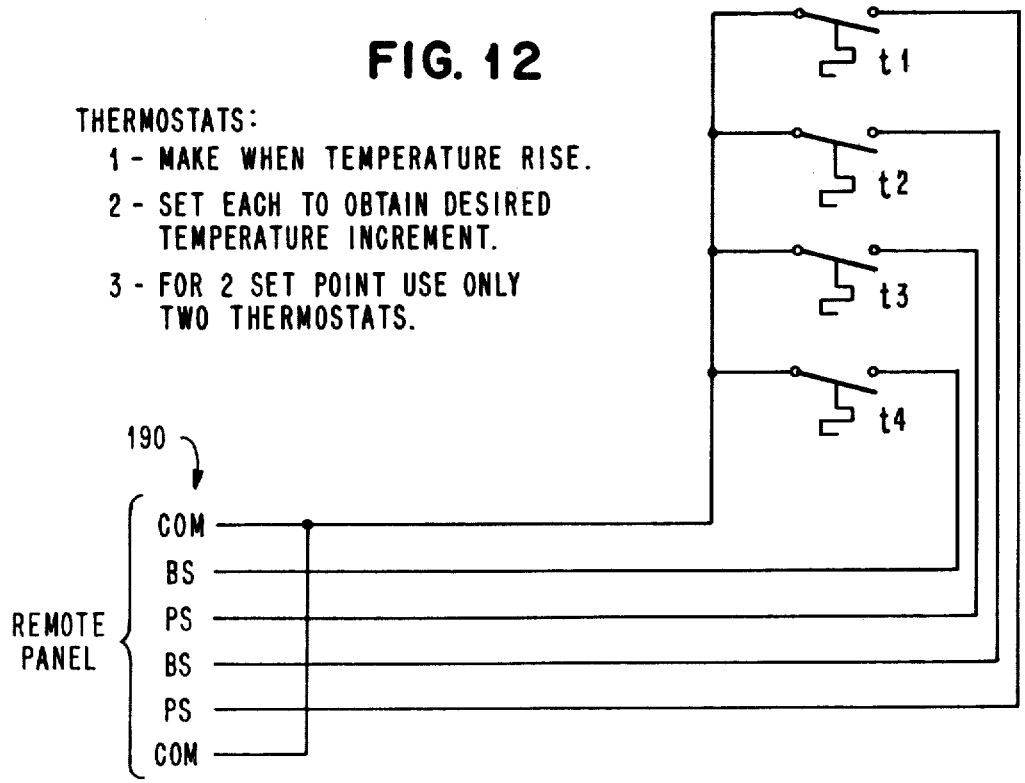
FIG. 12 is a wiring diagram illustrating connection of a set point thermostat circuit to a remote Panel.
Figure 13:
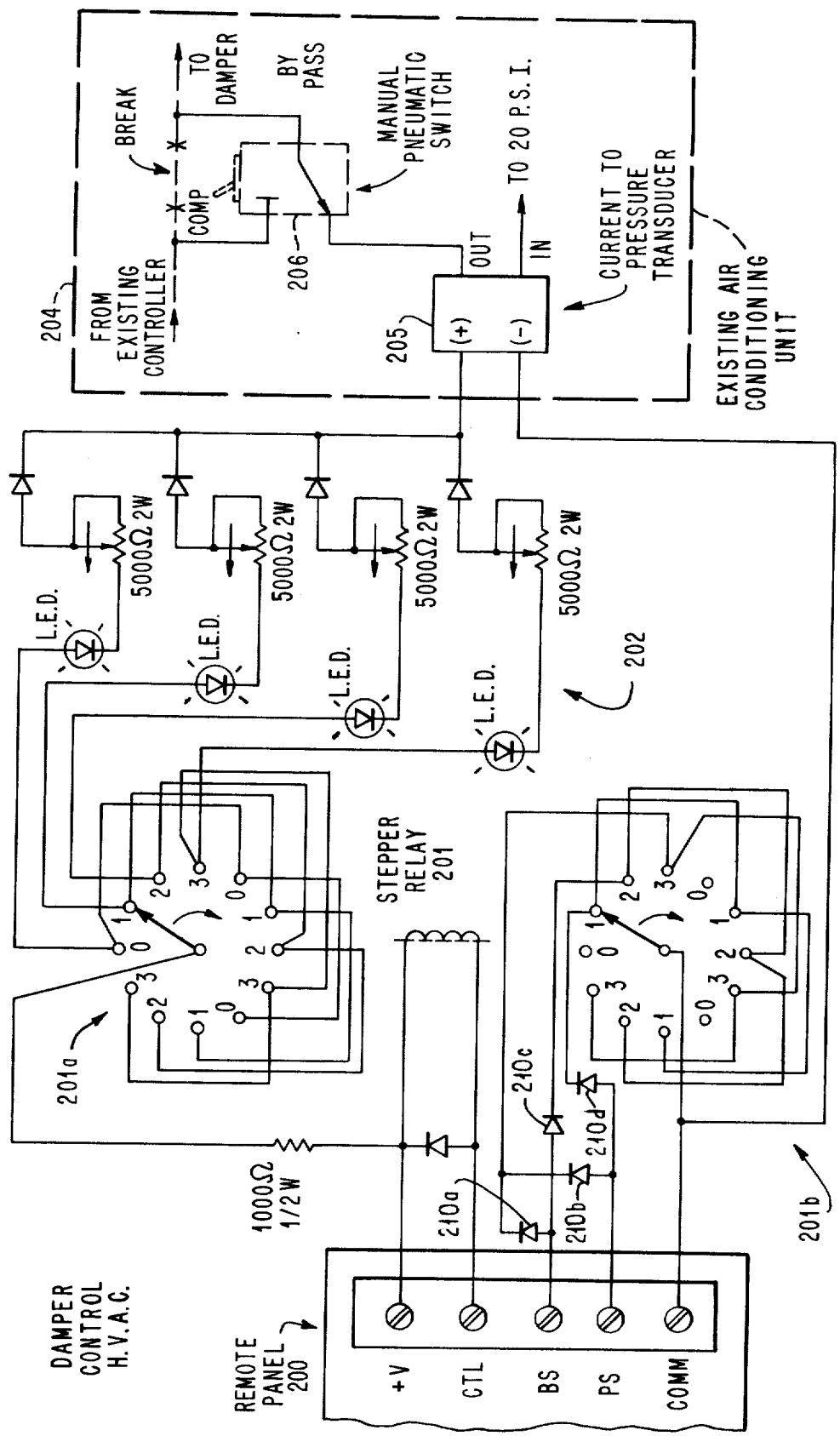
FIG. 13 is a wiring diagram illustrating connection of heating, ventilating, and air conditioning damper controls to a Remote Panel.

FIGS. 11, 12, and 13 are wiring diagrams of typical sensor devices that may be encountered in a system of this nature. The wiring diagrams of FIGS. 11-13 may or may not be used in conjunction with the sensor devices of FIG. 1. As an example, the push button start stop control circuit of FIG. 11 may be used with fan motor 60. However, the other control circuits of FIGS. 12 and 13 are supplemental to the kinds of circuits that would be associated with the other devices 61-63 in FIG. 1. The control circuit of FIG. 12, for example, is useful for monitoring thermostat conditions throughout a building. The control circuit of FIG. 13 represents a damper control arrangement useful in a heating, ventilating, and air conditioning (HVAC) system.

In FIG. 11 the dashed components represent elements that are found in the sensor device itself while the components shown with solid lines represent elements added for control purposes. As an example, start switch 170, stop switch 171, contactor coil 172 with associated contacts 173 are found in the sensor device such as a motor. Elements that are provided for control purposes include the Computer/Bypass switch 176, the control relay 177, a proof switch 178, and alarm switch 179 and various wiring interconnected with terminals shown at 180. The wiring at 180 in turn is connected with the related remote panel. With the Computer/Bypass switch 176 in the computer position, energizing the control relay 177 causes the contactor coil 172 to energize, starting the motor. The proof switch 178 and alarm switch 179 are connected to the sensor device in order to provide proof of operation or indicate an alarm condition, should one occur in the sensor device. The stop switch 171 and start switch 170 are inoperative when the Computer/Bypass switch is in computer position. When the Computer/Bypass switch is in the bypass position, the stop switch 171 and start switch 170 function as they normally do in a motor circuit.

Referring to FIG. 12, a circuit is shown for monitoring temperature set points using thermostats. The circuit includes thermostats designated $t1-t4$ interconnected by similarly designated lines and a common line to various terminals 190 that, in turn, are connected to the related remote panel. In this case, control functions are not being used and the terminals BS and PS, for example, are merely used for receiving status indications. A 15 volt signal level is provided to the right hand sides of thermostats $t1-t4$. Closure of one of the thermostats will connect a common lead on the left hand side of the particular closed thermostat to the signal source providing an indication in the remote panel that closure has occurred.

Referring to FIG. 13, a damper control circuit is shown. The connections to the related remote panel are shown at 200 with various lines designated +V, CTL, BS, PS, and COMM. These represent a plus voltage of, for example, 24 volts, a control line, a bypass switch termination, a proof switch termination, and a common return line. The control circuit of FIG. 13 further includes a stepper relay 201 and indicating circuits 202 which provide an indication of the stepper relay position that has been selected. Enclosed within the dashed lines 204 are a number of components that are found in an existing air conditioning unit, for example. These include a current to pressure transducer 205 and a manual pneumatic switch 206 together with various interconnecting circuit lines. The stepper relay 201 can be stepped by the control line from the remote panel. Stepping the relay 201 causes one of the four set point indicator circuits to be selected. The set point circuit selected causes a voltage to be present at the input to the current to pressure transducer 205, that is, on the plus input terminal, causing a pneumatic pressure signal to be sent to the existing damper to control its position by line 208. The foregoing is accomplished by means of wafer 201a of stepper relay 201. Wafer 201b provides a binary coded signal to the remote panel on the BS, and PS, inputs providing an indication in the remote panel of the set point circuit 202 that has been selected. Diodes 210a-210d provide the binary encoding function. For example, with the switch in the position indicated, diode 210d conducts providing an indication at terminal PS. All other diodes, 210a–210c, are blocked, giving a zero indication at the BS terminal.

Computer Interface

The computer I/O features required to control or monitor devices connected to the Remote Panels are as follows:
16 Digital Output Points
4 Digital Input Points The digital output points are preferably capable of sourcing +15 V DC, 1.2 milliamps. Typical logic levels to be sensed by the Digital Input points are as follows:

| | |
|---|---|
| Logic 1 | +13.5 to 15 VDC |
| Logic 0 | 0 to 1.5 VDC |

The computer most likely provides the primary means for initiating all control actions and for monitoring for appropriate status, logging, etc., of monitored devices connected to the subsystem. Manual operation is provided as a backup procedure for monitoring and control and a maintenance and problem determination tool.

Figure 14A:
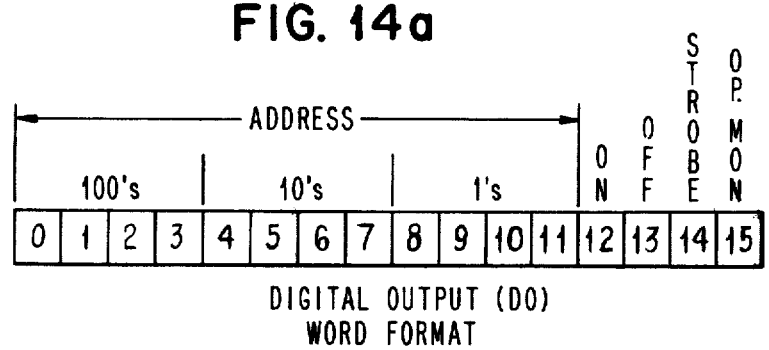
FIGS. 14a and 14b are format diagrams respectively illustrating a digital output word and a digital input half-byte, or nibble.

The computer digital output control bit format is shown in FIG. 14a. Sixteen digital control bits are required. The first twelve bits are address select lines used to address specific control and monitor circuits in the Remote Panels. Each Remote Panel control circuit has a unique Binary Coded Decimal address (BCD).

Figure 14B:
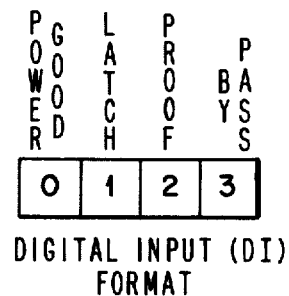

Four monitor bits, FIG. 14b, are available from each address for status monitoring. Two bits are from external contacts wired to the remote panels and two bits are associated with the Control circuits. The power good bit should be true anytime a valid address is entered and is used as an address channel supervision bit. If this bit is not true for a specific address, there is a system problem.

The Latch Status bit indicates the status of the latched Control output in the Remote Panels. A true condition indicates the control latch is on.

The status bits marked Proof and Bypass are external contacts wired to the Remote Panels. A true condition indicates the external contact is closed.

Figure 15:
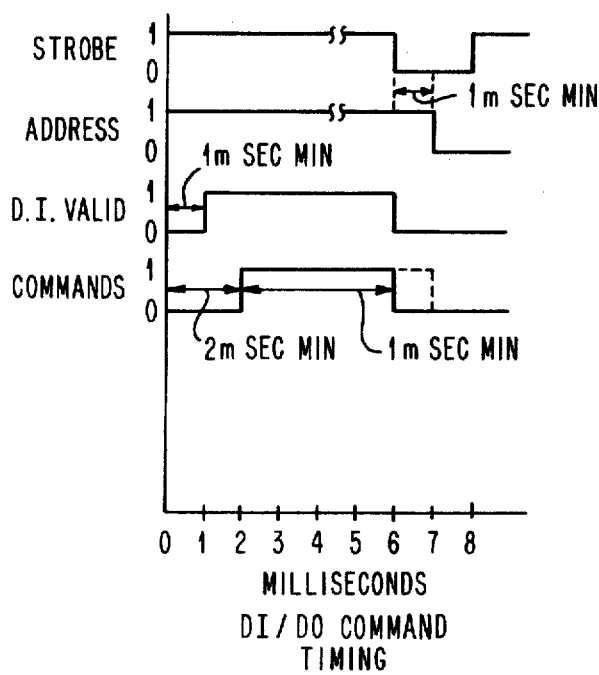
FIG. 15 illustrates timing requirements for digital input and digital output commands.

Command Sequence. To initiate an on/off command to any specific control output in the Remote Panels, the following sequence is used. See FIG. 15 for sequence timing.

1. Write Strobe (bit 14) and address (bits 0–11) bits. Ground the select lines to select appropriate bits. Unselected lines should be open or floating.
2. Data bits (see Monitor Section) will be valid after 1 millisecond and can be read if a status check is desired before proceeding with the command sequence.
3. Command bits (bits 12 or 13) can be written 2 milliseconds after the strobe and address bits. Hold command bit at least 1 millisecond.
4. If status check (see Monitor Section) is desired after the command is transmitted, status can be read 1 millisecond after the command bit is set.
5. Clear the strobe (bit 14) and command bit. Hold address bits (bits 0–11) a minimum of 1 millisecond after the strobe and command bit is cleared before writing a new address or clearing the address bits.

Figure 16:
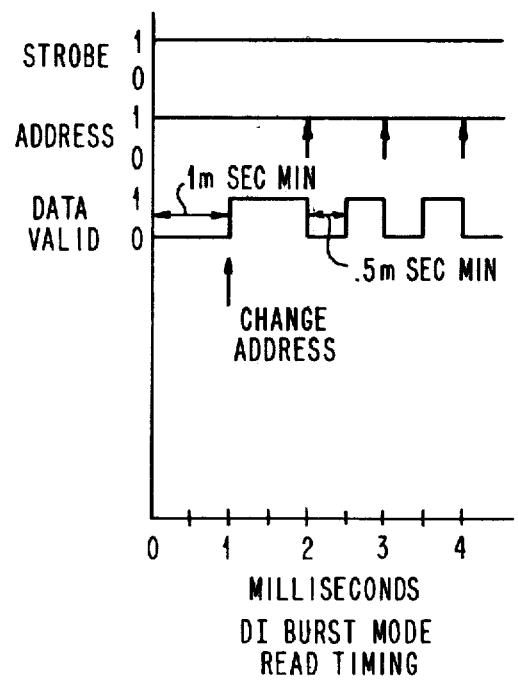
FIG. 16 illustrates timing requirements for a digital input burst mode read operation.

Status monitoring can be done as part of a control sequence (see Control) or as a pure monitor sequence. To monitor any specific points, the sequence shown in FIG. 16 is used.

1. Write strobe (bit 14) and address (bits 0–11) bits.
2. Status bits can be read 1 millisecond after setting strobe and address bits.
3. Hold strobe bit (bit 14) and write next address.
4. Status bits can be read after 0.5 milliseconds.
5. Repeat 4 and 5 until done.
6. Clear address and strobe bits.
7. Wait at least 1 millisecond before initiating a command or another read sequence.

Discussion of Detailed Circuit Diagrams

Detailed circuit diagrams of the subsystem are shown in FIGS. 17–20. FIGS. 17a–17h illustrate the detailed logic circuits for the central panel. FIGS. 18a–18d illustrate the detailed logic circuits for an individual remote panel. FIG. 19 is a diagram of a half-portion of an input-/output card. As previously indicated, each remote panel can accommodate up to ten such I/O cards. FIGS. 20a and 20b form a logic representation of such I/O card portion. The digital output card 145, FIG. 17a, and digital input card 146, FIG. 17g, correspond to similarly designated cards in FIG. 9. While the majority of the logic corresponds on a one-for-one basis with that previously set forth in FIGS. 10a and 10b, some variations exist and these will be pointed out as the description proceeds. Terminal strips 141, FIG. 17a, and 143, FIG. 17b, are designated with reference numbers identical to those on the terminal strips 141 and 143 shown in FIG. 9. Various ones of the other elements such as Command Switch 50, Strobe Switch 51, Display 43, Digital Alarm 41, et cetera, previously described in conjunction with FIG. 2 and also mentioned in conjunction with FIG. 10a are illustrated in FIGS. 17a–17h as well. Cards 220 and 221 are concerned with gating of computer addresses into the central panel. Card 222 provides for both address functions as well as command functions from the computer into the central panel. Cards 224 and 225 are also involved in the further gating of address information to remote panels by way of the driver block 233 and terminal strip 143. These address indications can be derived from the computer or from thumb wheel switch 52 in conjunction with card 228. In addition to card 225, card 226 is further involved in the manual addressing capabilities of the subsystem. It is noted at this time that data information provided at terminals 19–22 of terminal strip 143, FIG. 17h, operate indicators 45–48 and also drive elements 7–10 of card 226 for providing data indications to the computer by way of card 146.

Figure 17A:
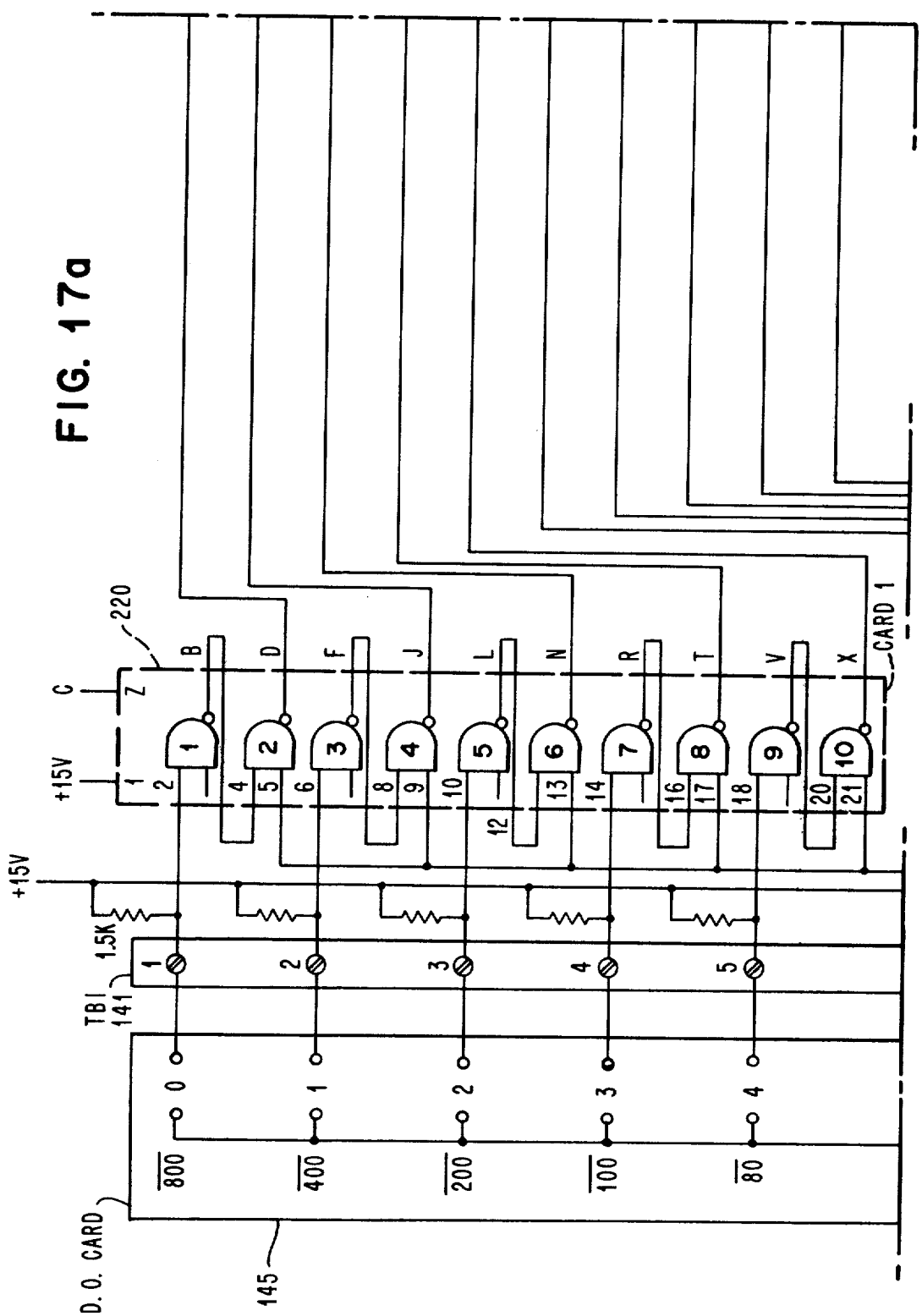
Figure 17B:
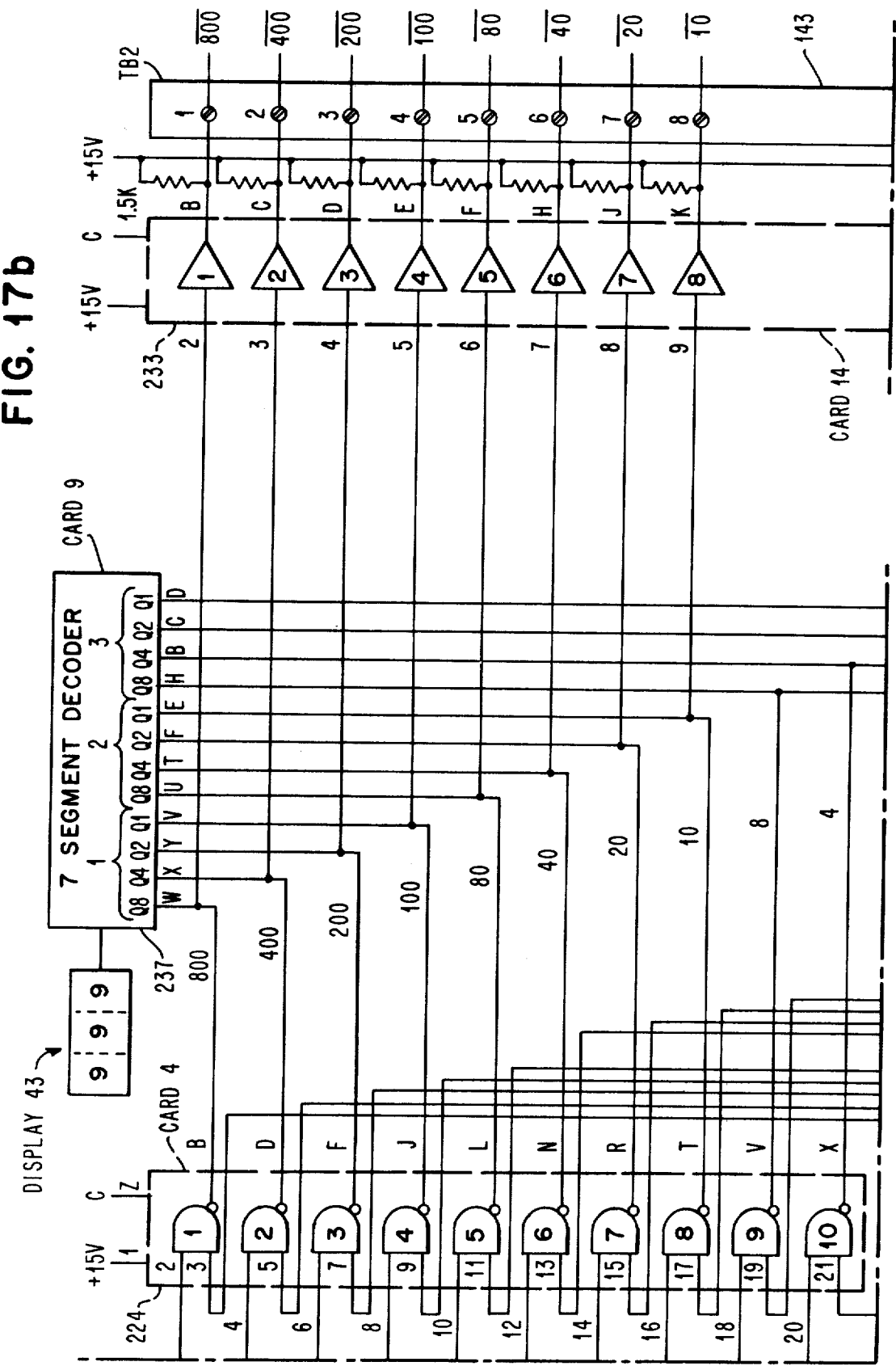
Figure 17C:
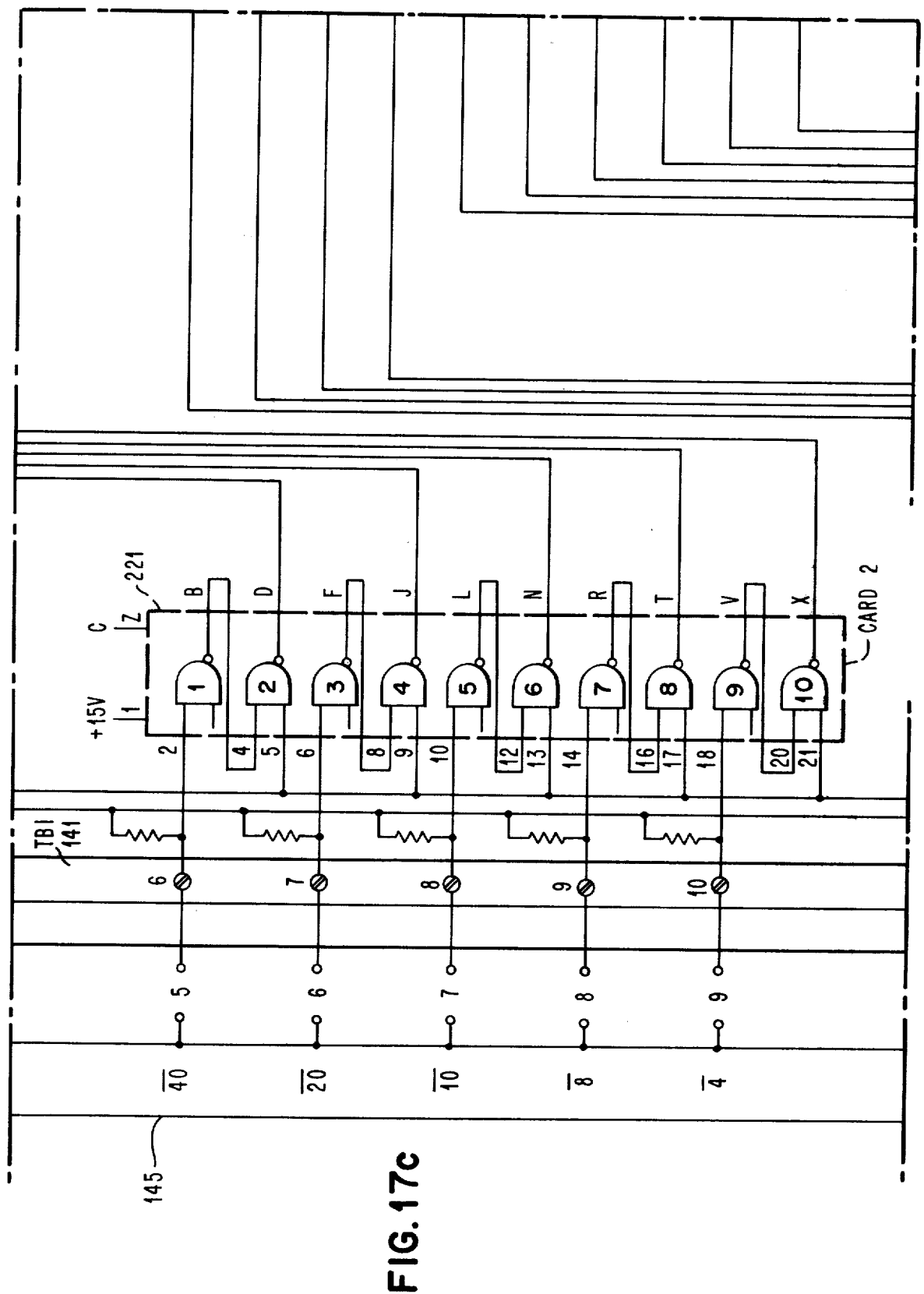
Figure 17E:
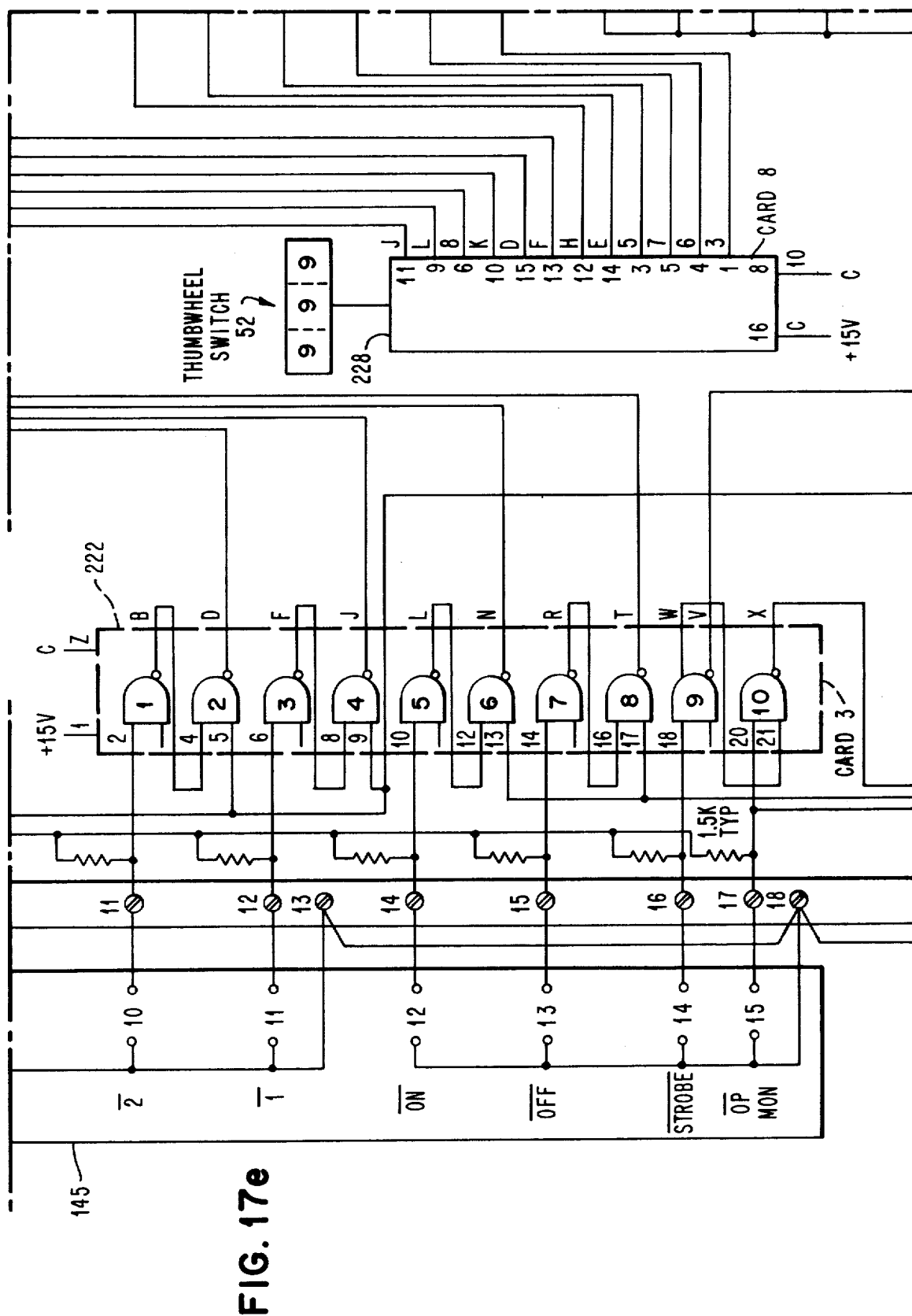

Cards 227, FIG. 17d, and 232, FIG. 17h, particularly concern manual or computer addressing and command selection. Card 230, FIG. 17g, provides timers for operating the operations monitor circuitry. These circuits in turn drive circuit card 235, FIG. 17h, by way of elements 6 and 7 on card 231, FIG. 17g, to provide the visual and audible alarm indications in the subsystem with element 40 providing the audible alarm indication, element 41, the visual alarm indication, and switch 55 providing an audible alarm silence function. Card 231, in addition, contains manual command functions from switch 50. In addition, the manual strobe switch 51 connects to element 5 on card 231. Card 237, FIG. 17b, provides a decode for the address being transmitted from the central panel to the remote panels by way of the output drivers 233 and terminal strip 143 and causing that address to be displayed on the display 43.

Remote Panel Circuits

Figure 18A:
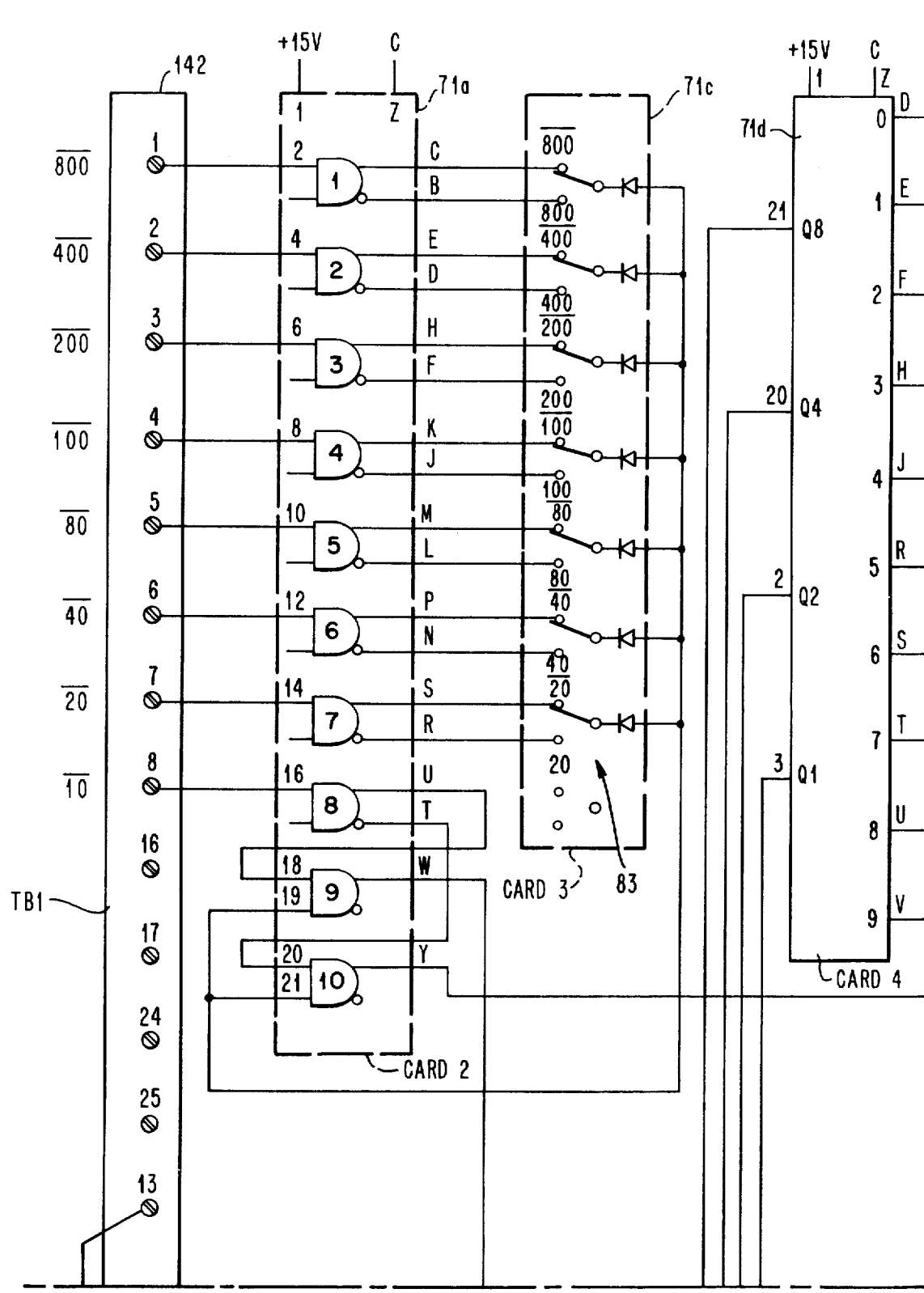
Figure 18B:
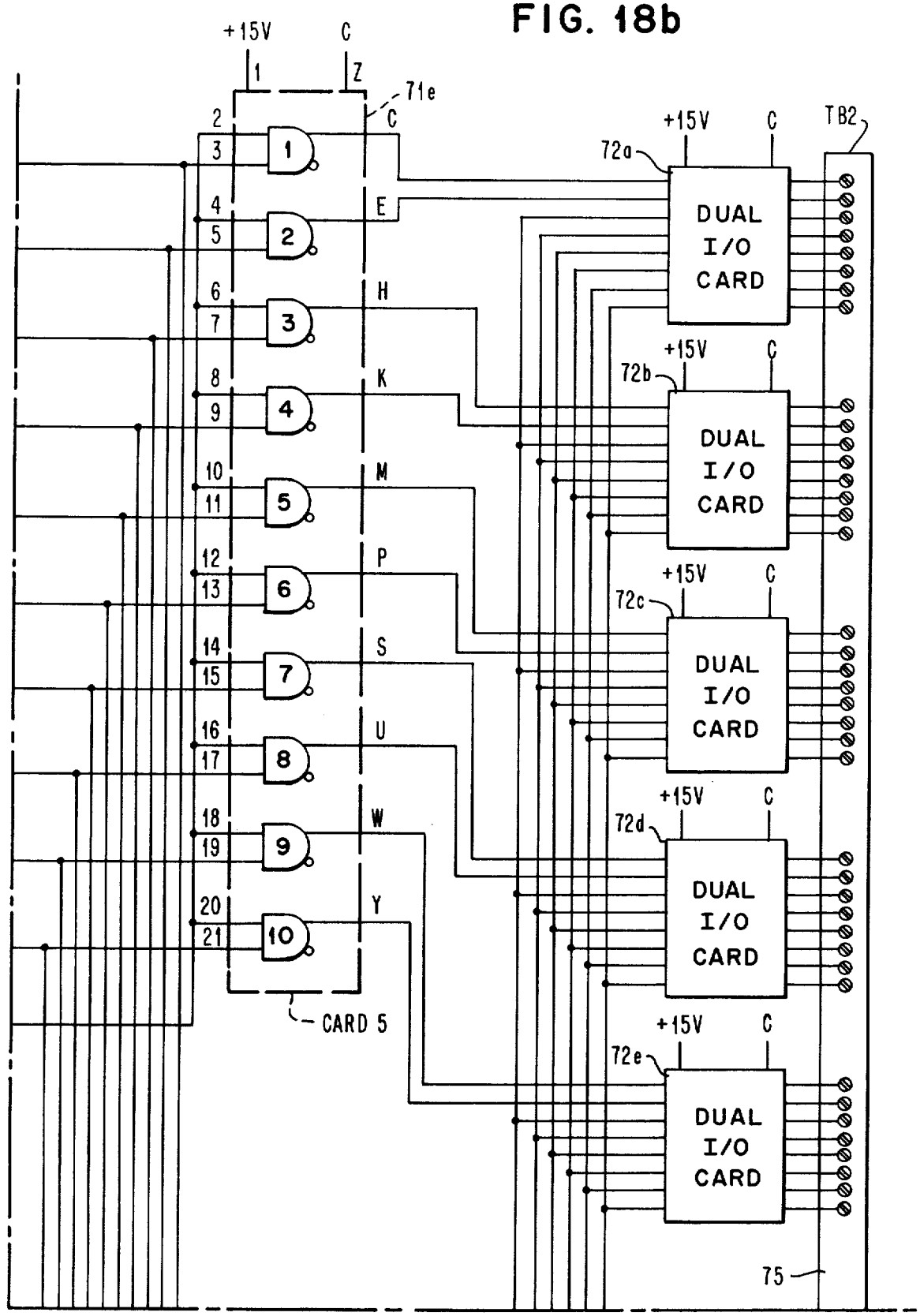
Figure 18C:
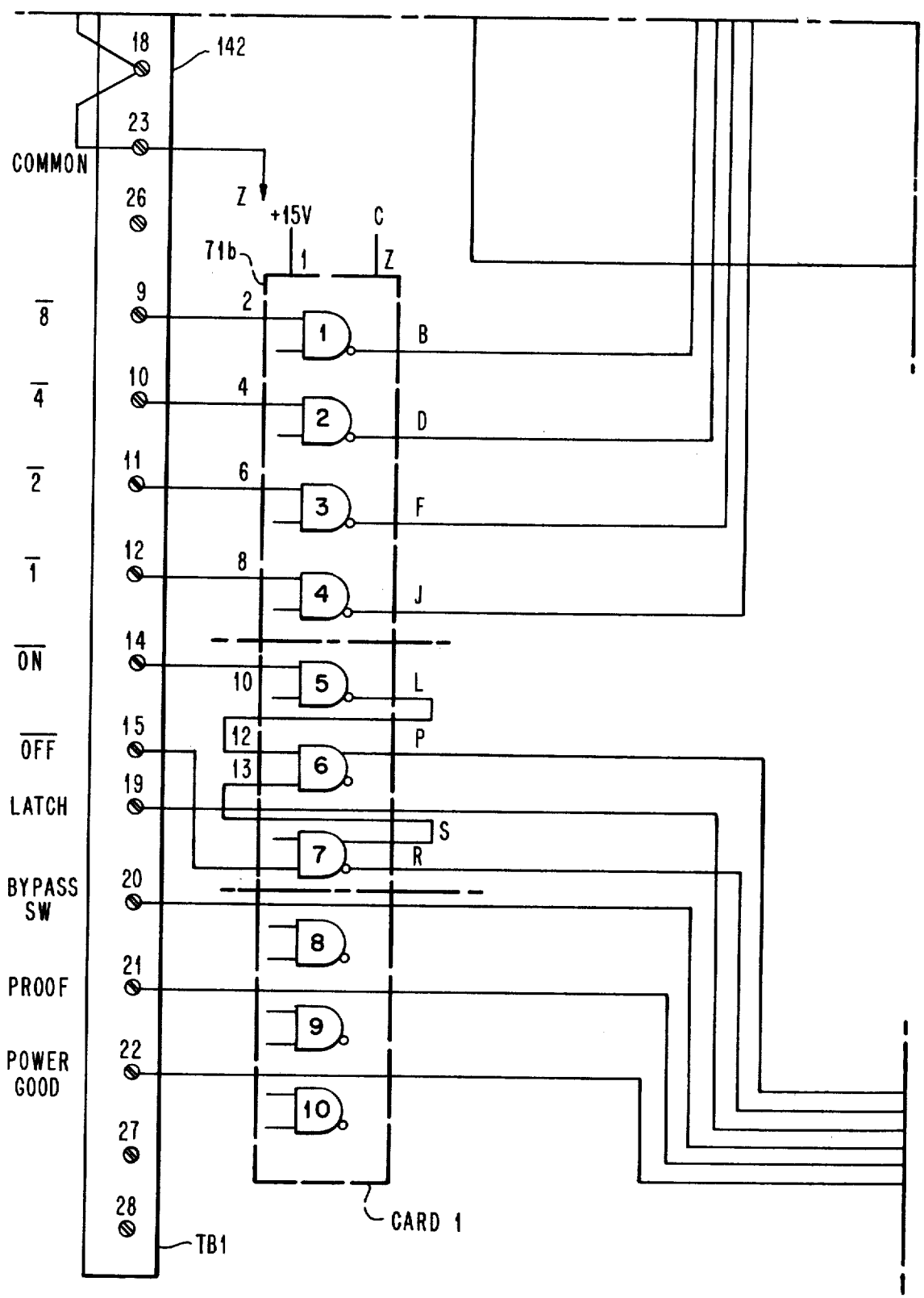
Figure 18D:
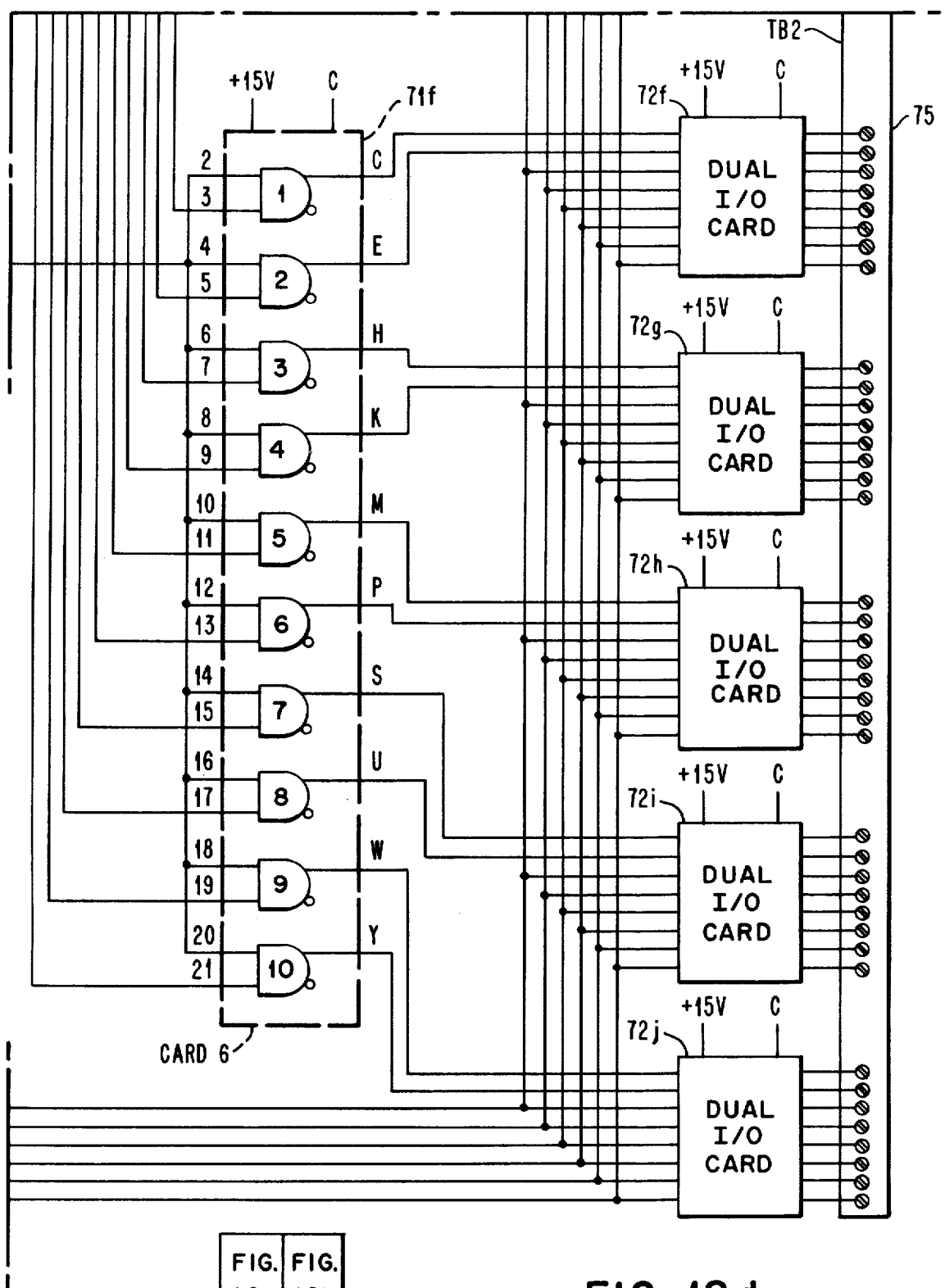

As previously indicated, FIGS. 18a–18d represent the detailed logic circuits for an individual remote panel. As with the circuits in FIGS. 17a–17h, various elements in FIGS. 18a–18d correspond to elements previously described in conjunction with other figures. For example, terminal strip 142, FIG. 18a, was discussed in connection with FIG. 9. Terminal strip 75, FIGS. 18b, 18d, was shown in FIG. 4. Cards 71a–71f correspond to similarly numbered control cards shown in FIG. 4. Also, ten dual I/O cards 72a–72j in FIG. 18 correspond to similarly designated I/O cards in FIG. 4. Cards 71a and 71c, FIG. 18a, provide remote panel address decode functions as previously discussed in connection with FIGS. 5a and 5b. Switches on card 71c are set to provide a unique remote panel address. Cards 71a, 71b, 71c, and 71f provide a point decoding function and, in conjunction with the remote panel address function provided by 71a and 71c, provide specific address selection to the dual I/O cards 72a–72j, FIGS. 18b, 18d.

Input/Output (I/O) Card Circuits

FIG. 19 is a functional diagram of a one-half portion of an individual input/output card while FIG. 20 represents a detailed logic diagram for an entire dual card, comprising two such portions.

Referring to FIG. 19, the primary components illustrated represent an independent function group. As an example, it may be assumed that FIG. 19 represents the upper half of card 72a, FIG. 18, as further represented in FIG. 5a. Inputs are provided to this one-half portion at terminals 250–254 while outputs are provided from terminals 255–260a. This one-half I/O card includes a latch element 265a, a driver circuit 266a, and an assortment of AND circuits 270–275. Hand Off Automatic Switch 88 was previously shown in FIG. 5a. Also shown are indicators 80, 84, and 86, previously illustrated in FIG. 5a. Assume switch 88 is in the A (Auto) position. The output from latch 265a will control driver 266a, turning external loads either on or off, depending upon the condition of latch 265a. An external load is indicated on line 259a with a K symbol in connection with an external control power source V. The latch is either set or reset by the on-line 251, off-line 252, in conjunction with a select input provided by the address decoders in the remote panel on line 250a. Outputs to the data bus are provided on lines 255 through 258 as a result of inputs on lines 253a, 254a, latch output from 265a, and a power good indication on the card. These outputs are available only when the select line is provided from the address decoders in the remote panel on line 250a. Indicators 80, 84, and 86 provide local indication of latch status and the status of the external contacts connected to lines 253a and 254a. Placing the switch 88 in the H (Hand) position, turns the output driver 266a on providing a continuous output from driver 266a independent of the latch 265a output.

Referring to FIGS. 20a and 20b, many of the same elements previously noted are set forth, particularly involving those elements just described in connection with FIG. 19 for the top half of the input/output card. However, all of the circuit elements are additionally provided for the lower half of input/output card 72a in FIGS. 20a, 20b as well. It is seen that, for example, all of the indicators 84–87 previously illustrated in FIG. 5a are fully shown together with the indicator driving circuits.

Terminals 259a and 260a correspond to those previously shown in FIG. 19. The circuit 266a, also illustrated in FIG. 19, actually comprises an open collector Darlington amplifier driver, including transistors 280 and 281. Further, the circuit of FIG. 20b for the upper one-half of the input/output card includes the Hand Off Auto Switch 88, shown in the Hand position. Latch 265a previously discussed in conjunction with FIG. 19, actually comprises two logical NAND blocks. The indicator 80 is also shown.

In addition to all of the foregoing, the specific components provided for the lower one-half portion of the input/output card are included in FIG. 20b, including the Hand Off Auto Switch 89, latch 265b, and the Darlington circuit 266b.

The Bypass and Proof switch inputs are shown to the center left of FIG. 20a with associated gating circuits. Output lines 257, 255, 258 and 256 designed BS, latch status, PS and Power Good are provided in the lower right portion of FIG. 20b.

Manual Procedures

The central panel can be used to either monitor or control the devices attached to the remote panels. The central panel is operated through the console shown in FIG. 2.

The console has:
  Visual and audible alarms.
  3-digit LED display.
  Status indicators.
  Command switch.
  Strobe switch.
  Address select.
  Key operated 3-position mode switch.
  Alarm acknowledge.

During a monitoring operation the key operated mode switch 54 may be in any of the 3 positions. The following steps are used for a typical Monitor Operation.

1. Determine the address to be monitored.
2. Set the address to be monitored in the address select switch 52.
3. Observe the address appearing in the display 43. If the display 43 does not indicate the address set in the address switches, or if the display is flickering, the computer override is in progress. Wait until the display settles down and indicates the address you have selected.
4. Observe the power good indicator 48 to see that it is on.
5. Observe the other status indicators 45–47 that are on to read the status of the address that is being monitored.

During a control operation the key operated mode switch 54 is set to either Manual or Computer Manual position. The following steps are used for a typical Control operation.

1. Determine the address of the point to be controlled.
2. Set the address to be controlled in the address select switch 52.
3. Observe the address appearing in the display 43. If the display does not indicate the address set in the address switches, or if the display is flickering, the computer override is in progress. Wait until the display settles down and indicates the address you have selected.

4. Observe the power good indicator 48 to see that it is on.

5. Check the control status by observing the other status indicators 45–47.

6. To turn control on or off, hold the on/off switch 50 to the desired position (when the switch is released it will automatically return to the center position).

7. While holding the on/off switch 50 in the desired position press the strobe pushbutton switch. This will execute the command.

8. Observe that the proper status indicators are on.

Alarm: The audible alarm 40 will sound if there is a computer program hangup or the computer interface to the central panel goes completely inactive. The audible alarm can be silenced by pressing the alarm acknowledge switch. The visual alarm indicator 41 will remain on until the computer program hang condition is corrected.

DETAILED DESCRIPTION

Computer Operation

To illustrate the operation of the subsystem that has been presented in connection with FIGS. 1–20b, it will first be assumed that an automatic computer controlled and response operation is taking place. For convenience, a computer operation is summarized. The computer operation involves the strobing and addressing from the computer through the central panel to a selected remote panel and interrogation of a selected sensor device as an outgoing sequence. The status of the selected sensor device is transmitted in turn through the remote panel to the central panel and ultimately to the computer in a response sequence for analysis and determination of further action. As another step in the sequence, the computer customarily issues a command which is transmitted to the central panel, then to the selected remote panel, and the selected sensor device, again in an outgoing sequence. The selected sensor device responds in some fashion to the command and provides additional status indications to the remote panel, the central panel, and the computer on the second response sequence of the operation. Referring to FIGS. 17a, 17c, 17e and 17g, the computer provides address inputs at terminal strip 141, terminals 1–12, and a strobe signal at terminal 16 of terminal strip 141. The strobe signal through cards 222, 227, and 232 enables the address presented by the computer to appear at the output terminal strip 143, terminals 1–12, FIGS. 17b, 17d. The address from terminal strip 143, FIGS. 17b, 17d, also appears at terminal strip 142, terminals 1–12, FIGS. 18a, 18c. Address decode modules 71a, 71b, 71c, 71d, FIGS. 18a, 18c, activate a single output line from modules 71e or 71f to select a specific upper or lower I/O card 72a–72j, FIGS. 18c, 18d.

Referring to FIG. 20a, the select line, for example, line 250a, becomes active causing the status indication from lines 253a, 254a, latch status from latch 265a and a power on indication from that specific I/O card to appear on the data bus, lines 255–258, FIG. 20b.

Returning to FIG. 18c, these indications are supplied on terminals 19–22 of terminal strip 142. These are further supplied to the central panel, FIG. 17h, at terminal strip 143, terminals 19–22. Appropriate indications appear on indicators 45–48 and, in addition, by elements 7–10 of card 226, FIGS. 17f, 17h, the status indications are transmitted to terminal strip 141, terminals 19–22, FIG. 17g, and to digital input card 146. That completes the first out and back sequence.

The next out and back sequence involves transmission of a command and verification of proper status data to assure that the command was transmitted properly. Command is initiated by the central processor at terminal 14 or 15 of terminal strip 141, FIG. 17e. It appears on output terminal strip 143, terminals 14 and 15, FIG. 17d, and then to terminal strip 142, FIGS. 18a, 18c, of all remote panels. The particular remote panel addressed through the addressing lines gates the on or off command signal to the appropriate dual I/O card. This on or off signal is latched into the I/O cards latching circuit, block 265a, of FIG. 20b. The output driver then turns on or off, depending on the command, resulting in turning on or off the attached sensor device. The attached sensor device then responds with any status changes as a result of the command on the status input lines, for example, lines 253a, 254a, of FIG. 20a. This status indication appears on lines 255–258 of FIG. 20b and additionally is transmitted to terminal strip 142 of FIG. 18c on terminals 19–22. In addition, this latch status is transmitted to terminal strip 143 of FIG. 17h, terminals 19–22. Status indicators 45–48 indicate the resulting status and additionally status indication is provided on terminal strip 141, 19–22, by module 226, FIG. 17f, and sensed by digital input card 146, FIG. 17g. This completes the second out and back sequence and further actually completes a typical computer operational sequence.

Manual Operation

A similar sequence is provided for in a manual operation. A first out and back sequence is provided by setting an address into the thumb wheel switches 52 of FIG. 17e, with switch 54, FIG. 17d, in either manual or computer manual position. With the address set into the thumb wheel switch 52, status indication for the addressed I/O card is displayed on indicators 45–48, FIG. 17h.

A command can be initiated manually by depressing the strobe switch 51 of FIG. 17g in conjunction with placing switch 50 in the appropriate command position (on/off). Just as in the computer operation case, a command is thereupon transmitted to the remote panel and activates a latch such as latch 265a of FIG. 20b causing the connected sensor device to turn on or off. Changes in status again are transmitted back to the central panel via the remote panel and can be viewed directly on indicators 45–48 of FIG. 17h for verification by the operator.

In conclusion, it is apparent that the present system provides a highly efficient technique for transmitting address and command information from either a central computer or a central panel station to remotely situated sensor devices by use of a small number of signal lines and in a highly efficient manner. Both automatic computer and manual operation are provided for in the system. Further, all functions necessary to provide driving signals and power indications being returned in the system are incorporated on convenient I/O cards, including all indicators required at the remote panel. This simplifies manufacturing, system analysis and maintenance operations.

It should be noted that the system described herein operates at very high speeds by virtue of the solid state characteristics of the sytem. Also, manual control and intervention, as well as status indications, are provided at the central panel as well as the various remote panels in the system. There is extensive manual overriding and control capability in the system.

While the invention has been particularly shown and described with reference to several preferred embodiments thereof, it will be understood by those skilled in the art that various changes in form and detail may be made therein without departing from the spirit and scope of the invention.

What is claimed is:

1. A sensor based system for monitoring sensor devices and issuing commands comprising:

a central processing unit, said central processing unit having program facilities, storage facilities and sensor interface facilities and said central processing unit further having address signal generating and command signal generating facilities as well as data signal analysis facilities;

a central panel unit, said central panel unit and said central processing unit being operable to control said system on a mutually exclusive and independent basis, said central panel unit having manual address signal generating means, manual command signal generating means, mode selection means for selecting at least (1) a manual/computer mode, wherein said system is controllable manually by an operator from said central panel unit or automatically by said central processing unit but on a mutually exclusive basis and (2) a computer only mode wherein said system is controlled solely by said central processing unit, said central panel unit further having first indication means for indicating addresses manually selected and second indication means for manifesting sensor status (data) indications;

system priority means operable when said mode selection means is in the manual/computer mode to enable control either by an operator from said central panel unit or by said central processing unit, but not both concurrently and said priority means having facilities for resolving attempts to simultaneously control the system from both said central processing unit and said central panel unit by establishing priority of computer addresses and commands over addresses and commands manually entered from said central panel unit, said priority means being further operable when said mode selection means is in the computer only mode to fully inhibit control from said central panel unit;

at least one remote panel unit, said remote panel unit having an associated plurality of addressable sensor input/output cards, said remote panel unit and each of said addressable sensor input/output cards having address decode circuits, command decode circuits, and data transmission circuits for use in conjunction with individual sensor devices interconnected with said sensor input/output cards, and said remote panel unit having address signal selection means for pre-establishing individual unique addresses for said remote panel unit and the sensor input/output cards associated with said remote panel unit;

an address bus, said address bus being interconnected with said central processing unit, said central panel unit and said at least one remote panel unit and its said associated input/output cards and said interconnected sensor devices for transmission of address signals;

a command bus, said command bus being interconnected with said central processing unit, said central panel unit, and said at least one remote panel unit for transmission of command signals;

a data bus, said data bus being interconnected with said central processing unit, said central unit and said remote panel unit for transmission of data signals; and sequencing means in said system, said sequencing means providing a sequence of operations when said central panel mode selection means is in the said (1) manual/computer mode and said system is being controlled either by an operator from said central panel unit or automatically by said central processing unit or (2) in said computer only mode, when said system is being controlled solely by said central processing unit, said sequence consisting of (A) generating address signals over said address bus for selection of an individual remote panel unit and an individual sensor device associated with said individual remote panel unit (B) transmitting data signals over said data bus from the sensor device selected through its associated remote panel unit, and said central panel unit to said central processing unit (C) analyzing said data signals in said central processing unit (D) transmitting command signals over said command bus to said selected sensor device and (E) transmitting further data signals from said selected sensor device to said central processing unit.

2. A sensor based system as claimed in claim 1, wherein:

said system is arranged for monitoring and control of building facilities, comprising heating, ventilating, or air conditioning facilities; and wherein said sensor devices include building facilities devices comprising fan motors, lighting panels, heating panels, compressor motors.

3. The system of claim 1, further comprising:

strobe means in said central processing unit for controlling the initiation and continuation of an addressing operation in said system; and write address means in said central processing unit effective only when said strobe means has been activated to address said remote panel units and their associated input/output cards and interconnected sensor devices.

4. The system of claim 1, wherein:

said first indication means comprises a lighted display panel for manifesting the address that is active.

5. The system of claim 1, wherein:

said second indication means comprises indicators for manifesting status identified as latch status indicative of the status of a latch in an individual sensor input/output card, power good indicative of a valid address having been entered, and proof and bypass indicative of the status of external contacts.

6. A sensor based system for monitoring sensor devices, comprising:

a central processing unit, said central processing unit having program facilities, storage facilities and sensor interface facilities and said central processing unit further having address signal generating facilities as well as data signal analysis facilities;

a central panel unit, said central panel unit and said central processing unit being operable to control said system on a mutually exclusive and independent basis, said central panel unit having manual address signal generating means, manual command signal generating means, mode selection means for selecting at least a (1) manual/computer mode wherein said system is controllable manually by an operator from said central panel unit or automatically by said central processing unit but on a mutually exclusive basis and (2) a computer only mode, wherein said system is controlled solely by said central processing unit and said central panel unit further having first indication means for indicating addresses manually selected and second indication means for manifesting sensor status indications;

system priority means operable when said mode selection means is in the manual/computer mode to enable control either by an operator from said central panel unit or said central processing unit but not both concurrently and said priority means having facilities for resolving attempts to simultaneously control the system from both said central processing unit and said central panel unit by establishing priority of computer addresses and commands over addresses and commands manually entered from said central panel unit, said priority means being further operable when said mode selection means is in the computer only mode to fully inhibit control from said central panel unit;

at least one remote panel unit, said remote panel unit having an associated plurality of addressable sensor input/output cards, said remote panel unit and each of said addressable sensor input/output cards having address decode circuits and data transmission circuits for use in conjunction with individual sensor devices interconnected with said sensor input/output cards and said remote panel unit having address signal selection means for pre-establishing individual unique addresses for said remote panel unit and the sensor input/output cards associated with said remote panel unit;

an address bus, said address bus being interconnected with said central processing unit, said central panel unit and said at least one remote panel unit and its said associated input/output cards and said interconnected sensor devices for transmission of address signals a data bus, said data bus being interconnected with said central panel unit and said remote panel unit for transmission of data signals; and sequencing means in said system, said sequencing means providing a sequence of operations when said central panel mode selection switch is in the said (1) manual/computer mode and said system is being controlled either by an operator from said control panel unit or automatically by said central processing unit or (2) in said computer only mode when said system is being controlled solely by said central processing unit, said sequence consisting of (A) generating address signals over said address bus for selection of an individual remote panel unit and an individual sensor device associated with said individual remote panel unit (B) transmitting data signals over said data bus from the sensor device selected through its associated remote panel unit, and said central panel unit to said central processing unit and (C) analyzing said data signals in said central processing unit.

7. A sensor based subsystem for monitoring sensor devices and issuing commands comprising:

a central processing unit, said central processing unit having program facilities, storage facilities and sensor interface facilities and said central processing unit further having address signal generating and command signal generating facilities as well as data signal analysis facilities;

a central panel unit, said central panel unit and said central processing unit being operable to control said system on a mutually exclusive and independent basis, said central panel unit having manual address signal generating means, manual command signal generating means, mode selection means for selecting at least a (1) manual mode wherein said system is controlled solely from said central panel unit, and (2) a manual/computer mode wherein said system is controllable manually by an operator from said central panel unit or automatically by said central processing unit but on a mutually exclusive basis, and said central panel unit further having first indication means for indicating addresses manually selected and second indication means for manifesting sensor status (data) indications;

system priority means operable when said mode selection means is in the manual/computer mode to enable control either by an operator from said central panel unit or by said central processing unit, but not both concurrently and said priority means having facilities for resolving attempts to simultaneously control the system from said central processing unit and said central panel unit by establishing priority of computer addresses and commands over addresses and commands manually entered from said central panel unit, said priority means being further operable when said mode selection means is in the manual mode to fully inhibit control by said central processing unit;

at least one remote panel unit, said remote panel unit having an associated plurality of addressable sensor input/output cards, said remote panel unit and each of said addressable sensor input/output cards having address decode circuits, command decode circuits, and data transmission circuits for use in conjunction with individual sensor devices interconnected with said sensor input/output cards and said remote panel unit having address signal selection means for pre-establishing individual unique addresses for said remote panel unit and the sensor input/output cards associated with said remote panel unit;

an address bus, said address bus being interconnected with said central processing unit, said central panel unit and said at least one remote panel unit and its said associated input/output cards and said interconnected sensor devices for transmission of address signals;

a command bus, said command bus being interconnected with said central processing unit, said central panel unit and said at least one remote panel unit for transmission of command signals;

a data bus, said data bus being interconnected with said central panel unit and said remote panel unit for transmission of data signals; and sequencing means in said system, said sequencing means providing a sequence of operations when said central panel mode selection switch is in the said (1) manual mode and said system is being controlled solely by an operator from said central panel unit or (2) in said manual/computer mode when said system is being controlled either by an operator from said central panel unit or automatically by said central processing unit, said sequence consisting of (A) generating address signals from said central panel for activation of said first indication means and transmission over said address bus for selection of an individual remote panel unit and an individual sensor device associated with said individual remote panel unit (B) transmitting data signals over said data bus from the sensor device selected through its associated remote panel unit to said central panel unit for activating said second indication means (C) after analysis by an operator, transmitting command signals from said central panel unit over said command bus to said selected sensor device and (D) transmitting further data signals from said selected sensor device to said central panel unit for further activation of said second indication means.

8. A sensor based system comprising:

a central processing unit, said central processing unit having program facilities, storage facilities and sensor interface facilities and said central processing unit further having address signal generating and command signal-generating facilities as well as data signal analysis facilities;

a central panel unit, said central panel unit and said central processing unit being operable to control said system on a mutually exclusive and independent basis, said central panel unit having manual address signal generating means, manual command signal generating means, mode selection means for selecting (1) a manual mode wherein said system is controlled solely by an operator from said central panel unit, (2) a manual/computer mode wherein said system is controllable both manually from said central panel unit or automatically by said central processing unit but on a mutually exclusive basis, and (3) a computer only mode wherein said system is controlled solely by said central processing unit, and said central panel unit further having first indication means for indicating addresses manually selected and second indication means for manifesting sensor status (data) indications;

system priority means operable when said mode selection means is in the manual/computer mode to enable control either by an operator from said central panel unit or by said central processing unit but not both concurrently and said priority means having facilities for resolving attempts to simultaneously control the system from both said central processing unit and said central panel unit by establishing priority of computer addresses and commands over addresses and commands manually entered from said central panel unit, said priority means being further operable when said mode selection means is in the manual mode to fully inhibit control from said central processing unit and when said mode selection means is in the computer only mode to fully inhibit control by an operator from said central panel unit;

at least one remote panel unit, said remote panel unit having an associated plurality of addressable sensor input/output cards, said remote panel unit and each of said addressable sensor input/output cards having address decode circuits and data transmission circuits for use in conjunction with individual sensor devices interconnected with card sensor input/output cards, and said remote panel unit having address signal selection means for pre-establishing individual unique addresses for said remote panel unit and the sensor input/output cards associated with said remote panel unit;

an address bus, said address bus being interconnected with said central processing unit, said central panel unit and said at least one remote panel unit and its said associated input/output cards and said interconnected sensor devices for transmission of address signals;

a data bus, said data bus being interconnected with said central processing unit and said remote panel unit for transmission of data signals; and sequencing means in said system, said sequencing means providing a sequence of operations when said central panel mode selection switch is in any position consisting of (A) generating address signals for activation of said first indication means and transmission over said address bus for selection of an individual remote panel unit and an individual sensor device associated with said individual remote panel unit, and (B) transmitting data signals over said data bus from the sensor device selected through its associated remote panel unit to a central panel unit for analysis by an operator.

9. A sensor based system comprising:

a central processing unit, said central processing unit having program facilities, storage facilities and sensor interface facilities and said central processing unit further having address signal generating and command signal generating facilities as well as data signal analysis facilities;

a central panel unit, said central panel unit and said central processing unit being operable to control said system on a mutually exclusive and independent basis, said central panel unit having manual address signal generating means, manual command signal generating means, mode selection means for selecting (1) a manual mode wherein said system is controlled solely from said central panel unit, (2) a manual/computer mode wherein said system is controlled both manually from said central panel unit or automatically by said central processing unit but on a mutually exclusive basis and (3) a computer only mode wherein said system is controlled solely by said central processing unit, and said central panel unit further having first indication means for indicating addresses manually selected and second indication means for manifesting sensor status (data) indications;

system priority means operable when said mode selection means is in the manual/computer mode to enable control either by an operator from said central panel unit or by said central processing unit, but not both concurrently and said priority means having facilities for resolving attempts to simultaneously control the system from both said central processing unit and said central panel unit by establishing priority of computer addresses and commands over addresses and commands manually entered from said central panel unit, said priority means being further operable when said mode selection means is in the manual mode to fully inhibit control from said central processing unit and when said mode selection means is in the computer only mode to fully inhibit control by an operator from said central panel unit;

at least one remote panel unit, said remote panel unit having an associated plurality of addressable sensor input/output cards, said remote panel unit and each of said addressable sensor input/output cards having address decode circuits, command decode circuits, and data transmission circuits for use in conjunction with individual sensor devices interconnected with said sensor input/output cards, and said remote panel unit having address signal selection means for pre-establishing individual unique addresses for said remote panel unit and the sensor input/output cards associated with said remote panel unit;

individual card command means in each of said sensor input/output cards for generating commands for control purposes;

individual card indicator means in each of said sensor input/output cards for indicating sensor device status;

an address bus, said address bus being interconnected with said central processing unit, said central panel unit and said at least one remote panel unit and its said associated input/output cards and said interconnected sensor devices for transmission of address signals;

a command bus, said command bus being interconnected with said central processing unit, said central panel unit and said at least one remote panel unit for transmission of command signals; and a data bus, said data bus being interconnected with said central processing unit, said central panel unit and said remote panel unit for transmission of data signals.

* * * * *